US011562244B2

United States Patent
Wang et al.

(10) Patent No.: US 11,562,244 B2
(45) Date of Patent: Jan. 24, 2023

(54) ROBUST PRUNED NEURAL NETWORKS VIA ADVERSARIAL TRAINING

(71) Applicant: ROYAL BANK OF CANADA, Montreal (CA)

(72) Inventors: Luyu Wang, Toronto (CA); Weiguang Ding, Toronto (CA); Ruitong Huang, Toronto (CA); Yanshuai Cao, Toronto (CA); Yik Chau Lui, Toronto (CA)

(73) Assignee: ROYAL BANK OF CANADA, Toronto (CA)

( * ) Notice: Subject to any disclaimer, the term of this patent is extended or adjusted under 35 U.S.C. 154(b) by 816 days.

(21) Appl. No.: 16/270,373

(22) Filed: Feb. 7, 2019

(65) Prior Publication Data

US 2019/0244103 A1    Aug. 8, 2019

Related U.S. Application Data

(60) Provisional application No. 62/629,433, filed on Feb. 12, 2018, provisional application No. 62/627,532, filed on Feb. 7, 2018.

(51) Int. Cl.
*G06N 3/08* (2006.01)
*G06F 17/13* (2006.01)
*G06F 21/57* (2013.01)
*G06F 21/55* (2013.01)

(52) U.S. Cl.
CPC .............. *G06N 3/082* (2013.01); *G06F 17/13* (2013.01); *G06F 21/552* (2013.01); *G06F 21/577* (2013.01); *G06N 3/084* (2013.01)

(58) Field of Classification Search
CPC ........ G06N 3/082; G06N 3/084; G06F 17/13; G06F 21/552; G06F 21/577
See application file for complete search history.

(56) References Cited

U.S. PATENT DOCUMENTS

| | | | |
|---|---|---|---|
| 10,417,525 B2* | 9/2019 | Ji | G06N 3/0454 |
| 11,275,996 B2* | 3/2022 | Yu | G06N 3/10 |
| 11,321,604 B2* | 5/2022 | Yu | G06N 3/04 |
| 2017/0278135 A1* | 9/2017 | Majumdar | G06Q 30/0256 |
| 2019/0278600 A1* | 9/2019 | Frumkin | G06N 3/0472 |
| 2020/0302295 A1* | 9/2020 | Tung | G06F 17/18 |

OTHER PUBLICATIONS

Wang et al. (Adversarial Robustness of Pruned Neural Networks, ICLR 2018, 5 pages) (Year: 2018).*
Bulo et al. (Dropout Distillation, JMLR 2016, 9 pages) (Year: 2016).*

(Continued)

*Primary Examiner* — Oleg Korsak
(74) *Attorney, Agent, or Firm* — Norton Rose Fulbright Canada LLP

(57) ABSTRACT

Systems, methods, and computer readable media are described to train a compressed neural network with high robustness. The neural network is first adversarially pre-trained with both original data as well as data perturbed by adversarial attacks for some epochs, then "unimportant" weights or filters are pruned through criteria based on their magnitudes or other method (e.g., Taylor approximation of the loss function), and the pruned neural network is retrained with both clean and perturbed data for more epochs.

23 Claims, 11 Drawing Sheets

(56) References Cited

OTHER PUBLICATIONS

Nicholas Carlini et al., Towards Evaluating the Robustness of Neural Networks, arXiv:1608.04644v2 [cs.CR], Mar. 22, 2017.
Yu Cheng et al., A Survey of Model Compression and Acceleration for Deep Neural Networks, arXiv:1710.09282v9 [cs LG], Jun. 14, 2020.
Ian J. Goodfellow et al., Explaining and Harnessing Adversarial Examples, arXiv:1412.6572v3 [ stat ML], Mar. 20, 2015.
Yiwen Guo et al., Dynamic Network Surgery for Efficient DNNs, arXiv: 1608.04493v2 [cs.NE], Nov. 10, 2016.
Song Han et al., Deep Compression: Compressing Deep Neural Networks With Pruning, Trained Quantization and Huffman Coding, arXiv:1510.00149v5 [cs.CV], Feb. 15, 2016.
Song Han et al., Learning bothWeights and Connections for Efficient Neural Networks, arXiv:1506.02626v3 [cs.NE], Oct. 30, 2015.
Ruitong Huang et al., Learning With a Strong Adversary, arXiv:1511 03034v6 [cs.LG], Jan. 16, 2016.
Alex Krizhevsky, Learning Multiple Layers of Features from Tiny Images, Apr. 8, 2009.
Alexey Kurakin et al., Adversarial Machine Learning At Scale, arXiv: 1611.01236v2 [cs.CV], Feb. 11, 2017.
Yann LeCun et al., Gradient Based Learning Applied to Document Recognition, Proc. of the IEEE, Nov. 1998.
Hao Li et al., Pruning Filters for Efficient Convnets, arXiv:1608.08710v3 [cs.CV], Mar. 10, 2017.
Aleksander Madry et al., Towards Deep Learning Models Resistant to Adversarial Attacks, arXiv:1706.06083v4 [stat. ML], Sep. 4, 2019.
Pavlo Molchanov et al., Pruning Convolutional Neural Networks for Resource Efficient Nference, arXiv:1611.06440v2 [cs.LG], Jun. 8, 2017.
Seyed-Mohsen Moosavi-Dezfooli et al., DeepFool: a simple and accurate method to fool deep neural networks, https://arxiv.org/abs/1511.04599, Nov. 14, 2015.
Nicolas Papernot et al., The Limitations of Deep Learning in Adversarial Settings, arXiv:1511.07528v1 [cs.CR], Nov. 24, 2015.
Sara Sabour et al., Adversarial Manipulation of Deep Representations, arXiv:1511.05122v9 [cs.CV], Mar. 4, 2016.
Abigail See et al., Compression of Neural Machine Translation Models via Pruning, arXiv:1606.09274v1 [cs.AI], Jun. 29, 2016.
Christian Szegedy et al., Intriguing properties of neural networks, arXiv:1312.6199v4 [cs.CV], Feb. 19, 2014.
Sergey Zagoruyko et al., Wide Residual Networks, arXiv:1605.07146v4 [cs.CV], Jun. 14, 2017.
Nicolas Papernot et al., Practical Black-Box Attacks against Machine Learning, arXiv:1602.02697 [cs.CR], Mar. 19, 2017.

\* cited by examiner

ROBUST PRUNED NEURAL NETWORKS VIA ADVERSARIAL TRAINING

CROSS REFERENCE TO RELATED APPLICATIONS

This application is a non-provisional of, and claims all benefit, including, priority to, U.S. Application No. 62/627,532, filed 2018 Feb. 7, entitled Robust Pruned Neural Networks via Adversarial Training, and U.S. Application No. 62/629,433, dated 2018 Feb. 12, entitled Crafting Adversarial Attack via Stochastic Gradient Descent, both of which are incorporated herein by reference in their entireties.

FIELD

The present disclosure generally relates to the field of machine learning, and more specifically, to robust pruned neural networks via adversarial training.

INTRODUCTION

Machine learning is useful for deep learning, and enables many novel applications in computer vision, speech recognition, and natural language processing. Application systems typically employ highly parameterized models to achieve record-breaking performance.

These models are machine learning architectures that can be resource intensive, especially if there are a large number of interconnections and a highly complex model being represented in the data structure.

There may be constraints on the available amount of computing resources, such as processor cycles available, data storage, computer memory, etc. this is particularly notable in mobile or portable computing.

A mobile device such as a smart phone, tablet, laptop computer, among others, has less resources available to it relative to non-portable devices.

Other devices having constrained resources could include inexpensive electronics having limited capability due to economic factors (e.g., microwave, vending machine). These devices may include components with reduced capabilities, such as field-programmable gate arrays, for example.

Accordingly, it is desirable to have compressed machine learning architectures such as compressed (e.g., pruned) neural networks.

There are various approaches to compressing machine learning architectures. These approaches typically remove aspects of machine learning architectures trading off performance (accuracy, speed) for reduced storage requirements, among others.

However, compressing these machine learning architectures, if done naïvely, results in machine learning architectures that are susceptible to adversarial attacks.

SUMMARY

Modern deep learning architectures require more computational resources in order to achieve the state-of-the-art performance. Machine learning architecture compression becomes increasingly important to enable these machine learning architectures to be deployed into resource-limited devices, such as mobile phones and other embedded systems.

One compression method is pruning, where "less important" weights or filters are pruned, results in a size-reduced machine learning architecture with comparable prediction accuracy. Network pruning is considered as one of the most effective approaches to achieve simultaneously high accuracy and high compression rate. However, as noted in embodiments herein, attention should not only be paid to classification accuracy, but also to robustness.

Deep neural networks are vulnerable to adversarial attacks—small perturbations that are negligible to humans, yet can easily fool the most advanced machine learning architectures. Adversarial examples for adversarial attacks cause misclassifications by taking advantage of differences between the function represented in the machine learning architecture as opposed to the actual ground truth (e.g., that can result due to overfitting to the training data). This problem makes deep learning systems vulnerable to malicious attacks. Adversarial examples cause the machine learning architecture to misclassify the examples at a high rate of occurrence.

As pruned machine learning architectures becomes more ubiquitous on portable devices, their security risks have not yet been well evaluated. Applicants note that such pruned neural networks are significantly vulnerable to such malicious attacks. Numerous numbers of compressed computer vision and natural language processing systems deployed in mobile phones and so on, greatly suffer from this security hole.

To resolve or reduce the impacts of this security issue that occurs in the context of pruned neural network and computer implementations thereof, Applicants propose to use adversarial training as a defence strategy, and demonstrate that it provides pruned neural networks with high robustness (e.g., hardened machine learning architectures). Adversarial examples are generated at various steps that are incorporated into training, and adversarial training involves using these adversarial examples to improve the accuracy of the function represented by the machine learning architecture.

This approach secures such machine learning architectures effectively, and may various applications in neural systems in mobile and portable devices. Various embodiments are described, including systems having both originating devices and recipient devices, as well as originating devices individually and recipient devices individually, and each of these can implemented, in some cases, on special purpose machines, such as a bootstrapping engine that is configured to interact with (a first) an uncompressed machine learning architecture to establish hardened compressed versions for deployment. In some embodiment, the first machine learning architecture may already have some level of compression.

The machine learning architecture is implemented in tangible, concrete forms of computer-implemented systems, methods, devices, and computer-readable media storing machine readable instructions thereof. For example, the system may operate in the form of computer implemented devices in a data center hosting a cluster of devices used for maintaining data sets representative of the neural network.

A hosted application, or a dedicated hardware/server device may be provided to perform steps of a computer implemented method for using adversarial training to harden neural networks. The machine learning architecture (e.g., neural network) may be pruned or prepared for loading onto a mobile device or a resource limited device, such as an field programmable gate array (FPGA), a smartphone, tablet, among others. In other embodiments, the system resides on a resource limited device for transforming un-pruned neural networks into compressed states.

The hardening techniques increase the robustness of the underlying neural networks after pruning, rendering them less vulnerable to malicious attacks in view of perturbations that appear negligible to humans, but can be otherwise exploited by malicious actors. The contributions are important because of the popularity of compressed machine learning architectures and aids in understanding and reducing their security risk. The proposed approach investigates the interplay between neural network pruning and adversarial machine learning, and applies, in various embodiments, both white-box and black-box attacks to machine learning architectures pruned by weights or filters.

Different types of attacks are based on the level of a knowledge of the attacker (e.g., black-box where the attacker knows nothing about the structure of the machine learning architecture, to white-box attacks where the attacker has an understanding of the machine learning architecture).

Applicants have noted that that pruned networks with high compression rates are extremely vulnerable to adversarial attacks, and have studied the effectiveness of adversarial training on pruned machine learning architectures, verifying experimentally that the proposed approach of some embodiments is an effective strategy to harden pruned machine learning architectures (e.g., neural networks) to become more secure and robust. Accordingly, the resultant machine learning architecture is less likely to be fooled by adversarial examples relative to a non-hardened machine learning architecture.

In an aspect, there is provided a method for training neural networks, the method comprising: receiving one or more data sets representative of a neural network; adversarially pre-training the neural network with both original data as well as data perturbed by adversarial attacks for one or more epochs; processing the neural network to prune unimportant weights or filters through one or more criteria to generate a pruned neural network; and retraining the pruned neural network with both clean and perturbed data for the one or more epochs.

A number of variations are also considered, where different approaches for hardening are considered, such as iterative/step-wise compression, different types of pruning approaches, different mechanisms for generating perturbed (adversarial) examples, among others.

In another aspect, the one or more criteria include assessing weights for pruning based on corresponding magnitudes of the weights or the filters.

In another aspect, the corresponding magnitudes are used to sort and rank the weights or the filters.

In another aspect, the one or more criteria include Taylor approximation of a loss function.

In another aspect, the pruning is utilized to cause the pruned neural network to be pruned at least to a baseline compression rate.

In another aspect, the pruning is utilized to cause the pruned neural network to be pruned to maintain a baseline accuracy level.

In another aspect, the baseline accuracy level is determined based on a level of accuracy against adversarially perturbed data.

In another aspect, the adversarial pre-training is conducted using fast-gradient sign method (FGSM) training.

In another aspect, the adversarial pre-training is conducted using projected gradient descent (PGD).

In another aspect, the pruned neural network, following retraining, is encapsulated in an output data structure.

In another aspect, there is provided a system for generating robust pruned neural networks, the system comprising at least one processor, computer readable memory, and data storage and receiving a neural network to be pruned to generate the pruned neural network, the system configured to perform any one of the methods described above.

In another aspect, there is provided a computer readable medium storing machine interpretable instructions, which when executed, cause a processor to perform the steps of any one of the methods described above.

In various further aspects, the disclosure provides corresponding systems and devices, and logic structures such as machine-executable coded instruction sets for implementing such systems, devices, and methods.

In this respect, before explaining at least one embodiment in detail, it is to be understood that the embodiments are not limited in application to the details of construction and to the arrangements of the components set forth in the following description or illustrated in the drawings. Also, it is to be understood that the phraseology and terminology employed herein are for the purpose of description and should not be regarded as limiting.

Many further features and combinations thereof concerning embodiments described herein will appear to those skilled in the art following a reading of the instant disclosure.

DESCRIPTION OF THE FIGURES

In the figures, embodiments are illustrated by way of example. It is to be expressly understood that the description and figures are only for the purpose of illustration and as an aid to understanding.

Embodiments will now be described, by way of example only, with reference to the attached figures, wherein in the figures.

DETAILED DESCRIPTION

Figure 1A:
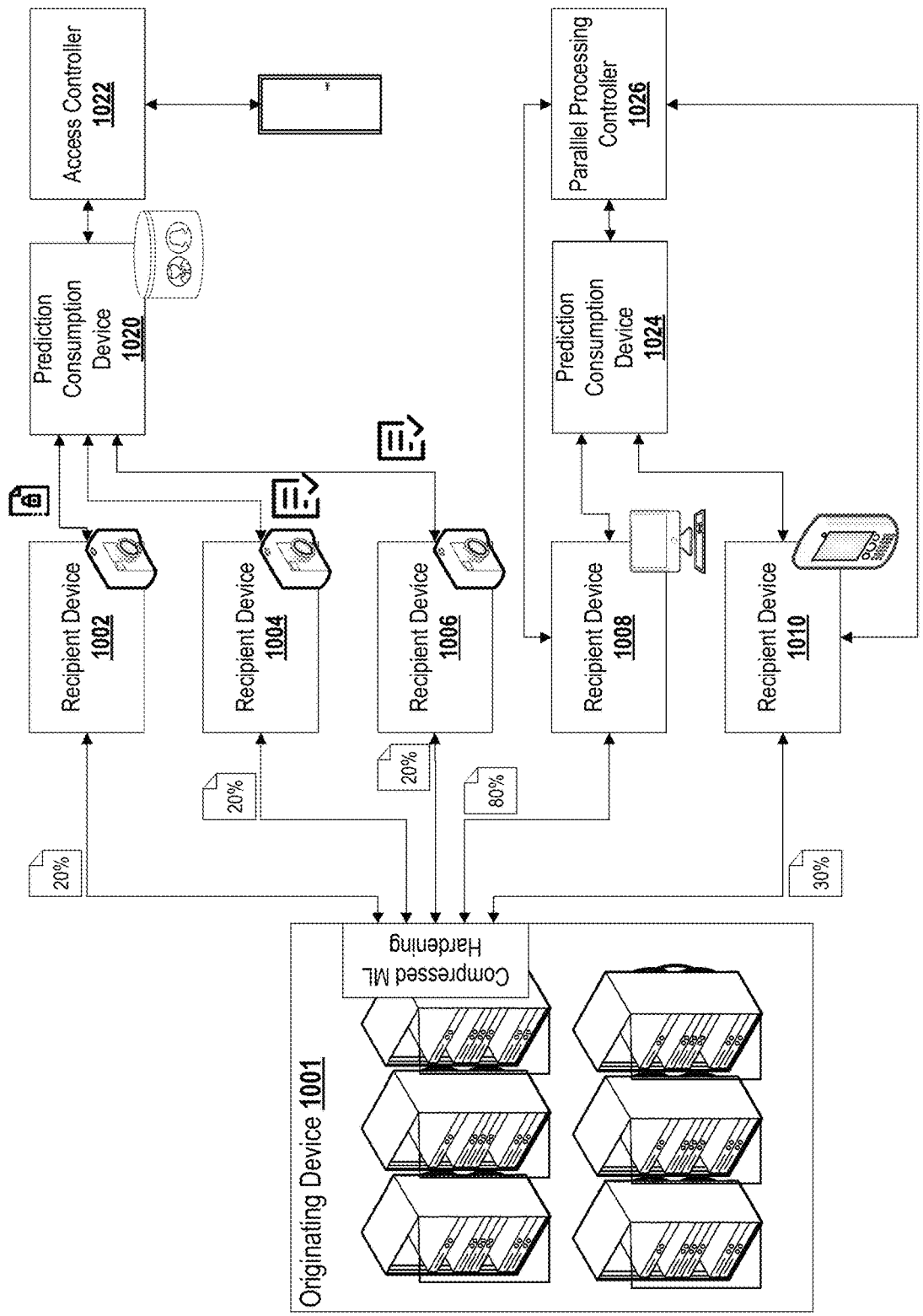
FIG. 1A is a block schematic of a distributed system for utilizing hardened compressed machine learning architectures, according to some embodiments.

There are various situations where compressed machine learning architectures are useful. For example, it may be advantageous to perform training on an originator device having a significant level of computing resources (e.g., a supercomputer). In some embodiments, the originator device is a set of distributed computing resources, and is adapted for conducting one or more operations on a highly parameterized high-performance machine learning architecture (e.g., through model distillation).

A compressed machine learning architecture is established through steps of compression and/or pruning. For example, a highly parameterized high-performance machine learning architecture, can be used as a "teacher" to train the "student" model, which is a much smaller model adapted for fast inferences. Another approach to compress the machine learning architecture is through weight sharing and quantization: weights of deep models are represented by low-precision numbers to reduce storage and computation requirements. Compression can also reduce overall energy consumption, where energy usage is a consideration (e.g., lower memory access reduces energy consumption). Using a compressed model can further increase overall speed of the machine learning architecture.

An extreme case of compression is binarized networks, where each weight is only represented by a binary number. Meanwhile, for convolution neural networks (CNNs), because the convolution operation is computationally demanding, low-rank factorization approach has been proposed as a computationally efficient approximation.

Weight pruning is a simple yet effective compression method. The method proceeds in three stages: first a full network is trained as usual; then unimportant weights are pruned according to some criteria, resulting in a sparse model with lower accuracy; finally, the sparse model is fine-tuned to recover the original accuracy. Moreover, filter pruning for CNNs is proposed to obtain machine learning architectures that are more compatible with the hardware. Pruning has the advantage over other compression methods that it produces machine learning architectures with high compression rate and high accuracy. It is applied to computer vision and natural language processing systems.

Orthogonal to the machine learning architecture compression and pruning approaches, deep machine learning architectures have the vulnerability that they can be fooled to make wrong predictions on inputs that are carefully perturbed. One explanation is that deep neural networks, despite very complex architectures, contain mostly linear operations; this allows one to easily craft adversarial examples from the first order approximation of the loss function. Many stronger adversarial attacks are also proposed, as well as attacks targeting tasks other than classifications, or the internal representation of a neural net.

Such possibility imposes a security concern that malicious activities targeting deep learning systems such as self-driving cars will put people's lives at stake. These attacks typically require the gradient information from the target machine learning architectures to be attacked; however, it is discovered such attacks can be crafted even without direct access to the underlying components of the model architecture.

The so-called black-box attack only requires knowing the predictions from the target machine learning architectures. In order to defend against adversarial attacks, defensive distillation is proposed in which one can control the local smoothness of the student model to achieve gradient masking, but later it is shown to be also vulnerable.

An improved defence is through adversarial training. A more robust model can be obtained when the adversarial examples in the training procedure are included, according to some embodiments described herein. Modern deep learning models require more and more computational resources in order to achieve the state-of-the-art performance.

Therefore model compression becomes increasingly important to enable these models to be deployed into resource-limited devices, such as mobile phones and other embedded systems. Accordingly, the improved defence hardens a machine learning architecture by reducing its likelihood of generating incorrect predictions when faced with perturbed examples (e.g., adversarial attacks). Increased resiliency is then established by reducing the machine learning architecture's vulnerability to these types of attacks (e.g., reducing an ability of a malicious user to try to use adversarial attacks to "fool" the machine learning architecture).

One compression method is pruning, where "unimportant" weights or filters are pruned, resulting in a size-reduced model with comparable prediction accuracy. Network pruning is considered one of the most effective approaches to achieve simultaneously high accuracy and high compression rate. Deep neural networks are vulnerable to adversarial attacks—small perturbations that are negligible to humans, yet can easily fool the most advanced models. This problem makes deep learning systems vulnerable to malicious attacks.

As pruned models becomes more ubiquitous on portable devices, their security risks grow more concerning. Applicants' research indicates that such pruned neural networks are extremely vulnerable to such malicious attacks. This means numerous numbers of compressed computer vision and natural language processing systems deployed in mobile phones and so on greatly suffer from this security hole which is previously unknown.

To reduce the impact of and/or resolve this issue, Applicants have proposed specific devices, systems, methods and approaches for adapting adversarial training as a defence strategy, and demonstrate that the approaches of some embodiments provide pruned neural networks with high robustness. This approach secures such models effectively, and may find applications in neural systems in mobile and portable devices.

As described in various embodiments, computer implemented systems and methods for hardening a compressed machine learning architecture for resilience against adversarial attacks is described. The hardened, trained, and compressed machine learning architecture can then be deployed to various recipient devices, which when using the machine learning architecture retain a level of resilience against adversarial attacks that would otherwise have been compromised in a naive compressed machine learning architecture.

FIG. 1A is a block schematic of a distributed system for utilizing hardened compressed machine learning architectures, according to some embodiments.

An originating device 1001 is shown that is capable of interoperating with an uncompressed machine learning architecture. In some embodiments, originating device 1001 includes data storage maintaining/storing the underlying computational representations of the uncompressed machine learning architecture. In alternate embodiments, originating device 1001 controls operations involving machine learning architecture stored on separate storage devices (e.g., originating device 1001 can operate as a bootstrapped hardening engine for generating compressed versions of existing machine learning architectures). A bootstrapped version is useful, for example, where the originating device 1001 is used for a retrofit to improve resilience of an existing framework.

The originating device 1001 may include significant computing resources and storage capabilities (e.g., as a supercomputer) and, in accordance with various embodiments herein, is adapted to harden a compressed machine learning architecture such that the hardened compressed machine learning architecture is less susceptible to adversarial attacks relative to other compressed machine learning architectures.

The increased computing resources of an originating device may allow for faster training (e.g., more epochs/iterations), larger machine learning architectures (e.g., more weights, filters), representing more complex representations of one or more underlying policy transfer functions. A compressed machine learning architecture can be generated by reducing the size of the machine learning architecture, for example, by selectively pruning aspects of the trained machine learning architecture. A compressed, trained machine learning architecture can then be deployed for use by recipient devices having less computational resources than the originating device.

A technical drawback of compressing machine learning architectures (e.g., models) is an increased vulnerability to adversarial attacks. This problem is exacerbated as the level of compression increases. For example, a machine learning architecture, trained against adversarial attacks, once compressed, may no longer be resilient to adversarial attacks.

As described in some embodiments, the process to harden a compressed machine learning architecture may be an iterative process where a series of compression steps are taken to arrive at a desired level of compression. A level of compression may be established by a target resultant size (e.g., reduced filesize volumes) of a compressed machine learning architecture, or based on a desired maximum allowable reduction in accuracy against an original validation set (e.g., the maximum amount of compression that retains at least 90% accuracy relative to the original validation set.

The originating device 1001 hardens the compressed machine learning architectures by training them against adversarial sets generated based on a clean training set. In some embodiments, during each iteration, a new set of adversarial sets is generated based on the state of the compressed machine learning architecture for the iteration.

The originating device 1001 is configured to generate one or more hardened compressed machine learning architectures, and the various hardened compressed machine learning architectures can be at different levels of compression. In the example shown in FIG. 1A, there are multiple recipient devices 1002 . . . 1010, which are in electronic communication with originating device 1001, which generates and deploys the hardened compressed machine learning architectures.

In this example, recipient devices 1002, 1004, 1006 are cameras, which have limited on-board storage capabilities. Accordingly, the distributed hardened compressed machine learning architectures are generated such that they are able to be used by the cameras given their limitations. In this example, the cameras are utilized to each apply the hardened compressed machine learning architectures to conduct template matching to predict captured image data and their associations with a backend template matching service, such as prediction consumption device 1020.

The prediction consumption device 1020, for example, could be an active directory storing user profiles, and based on the predictions, the prediction consumption device 1020 may associate the captured image data with predicted users. Based on the predictions, control signals may be transmitted to access controller 1022, which may control access to resources based on the predictions. Resources can include physical access to premises (e.g., a smart door), virtual resources (e.g., computer log-in), purchasing (e.g., a fast-check out counter at a supermarket), among others. In another embodiment, the prediction consumption device 1020 is used for quick pattern recognition (e.g., scanning for faces having features matching criminals having outstanding warrants).

In an alternate embodiment, the recipient devices communicate directly their predictions to access controller 1022, for example, simply indicating that access should be granted when a positive determination is made and therefore no prediction consumption device 1020 (e.g., a backend server) is necessary.

A practical example of such an implementation would be controlling access at a bar establishment, where the cameras each associate recognized faces with predicted user profiles. The prediction consumption device 1020 in this example returns data sets representative of characteristics of the users to access controller 1022, which may be configured to automatically lock a door (e.g., activate a solenoid to control electromagnetics of a door lock) if a user's characteristic indicates, for example, that the user is underage. Another example could be a smart parking lot where license plate values are read and used for controlling gate access.

The computing constraints of the recipient devices 1002, 1004, 1006 require the deployment of compressed machine learning architectures. However, as compressed machine learning architectures are more susceptible to adversarial attacks, the originating devices 1001 is configured to first harden the compressed machine learning architectures prior to deployment. Adversarial attacks could be used to perpetuate fraud or to cause undesirable outcomes (e.g., false positives, false negatives). Accordingly, the recipient devices 1002, 1004, 1006 are then less likely to be fooled by a user holding up an adversarial attack image to cover their face/license plate, among others.

An alternate example is shown in relation to recipient devices 1008 and 1010, which are configured to interoperate as a parallelized deployment of the machine learning architectures using reduced hardware. For example, a supercomputer may be established using an underlying set of decreased performance computers (e.g., a supercomputer consisting of interconnected Raspberry PI™ computers). The set of decreased performance computers can be used in parallel to each scan a sub-section of code to generate predictions based on the compressed machine learning architectures in relation to whether the code contains undesirable attributes, such as malicious or poorly written software code, among others.

Due to their constraints, similarly, recipient devices 1008 and 1010 require compressed machine learning architectures, and utilize the compressed machine learning architectures to generate predictions which, for example, can be provided back into a prediction consumption device 1024, and used to control downstream parallel processing controller 1026. In this example, the originating device 1001 may be tasked with a pattern recognition task that benefits from parallelization, such as a task that can be segmented into sub-tasks (e.g., sub-search domains). However, to reduce the susceptibility of the recipient devices 1008 and 1010 to adversarial attacks, the originating device 1001 first hardens the compressed machine learning architectures during generation.

The parallel processing controller 1026 of this example may be configured to segment the search domain into a series of sub-search domains for assignment to various recipient devices. In a further embodiment, the parallel processing controller 1026 further controls a compression level of the compressed machine learning architectures deployed to recipient devices and may request one or more data structures to be generated by the originating device 1001. The parallel processing controller 1026 can be configured to assign different tasks to different recipient devices, each having a different level of compression.

For example, for more challenging sub-search domains requiring a higher level of accuracy, the parallel processing controller 1026 may assign a recipient device having a higher classification accuracy score (and a less compressed machine learning architecture). Similarly, parallel processing controller 1026 may also assign multiple recipient devices the same task to provide an improved level of redundancy in the event of a conflicting prediction.

In some cases, the parallel processing controller 1026 is configured to control devices having a mix of hardened and unhardened compressed machine learning architectures, assigning processing tasks to the hardened machine learning architectures where there is a higher risk of an adversarial attack (e.g., exposed inputs received from internal sources), and assigning processing tasks to the unhardened compressed machine learning architectures where there is lower risk of an adversarial attack (e.g., inputs received from other internal systems). Accordingly, the parallel processing controller 1026 is adapted to generate control signals that modify the amount of compression and hardening activities applied by the originating device 1001 based on a detected need, balancing resources available against acceptable levels of accuracy degradation and robustness against adversarial attacks.

Figure 1B:
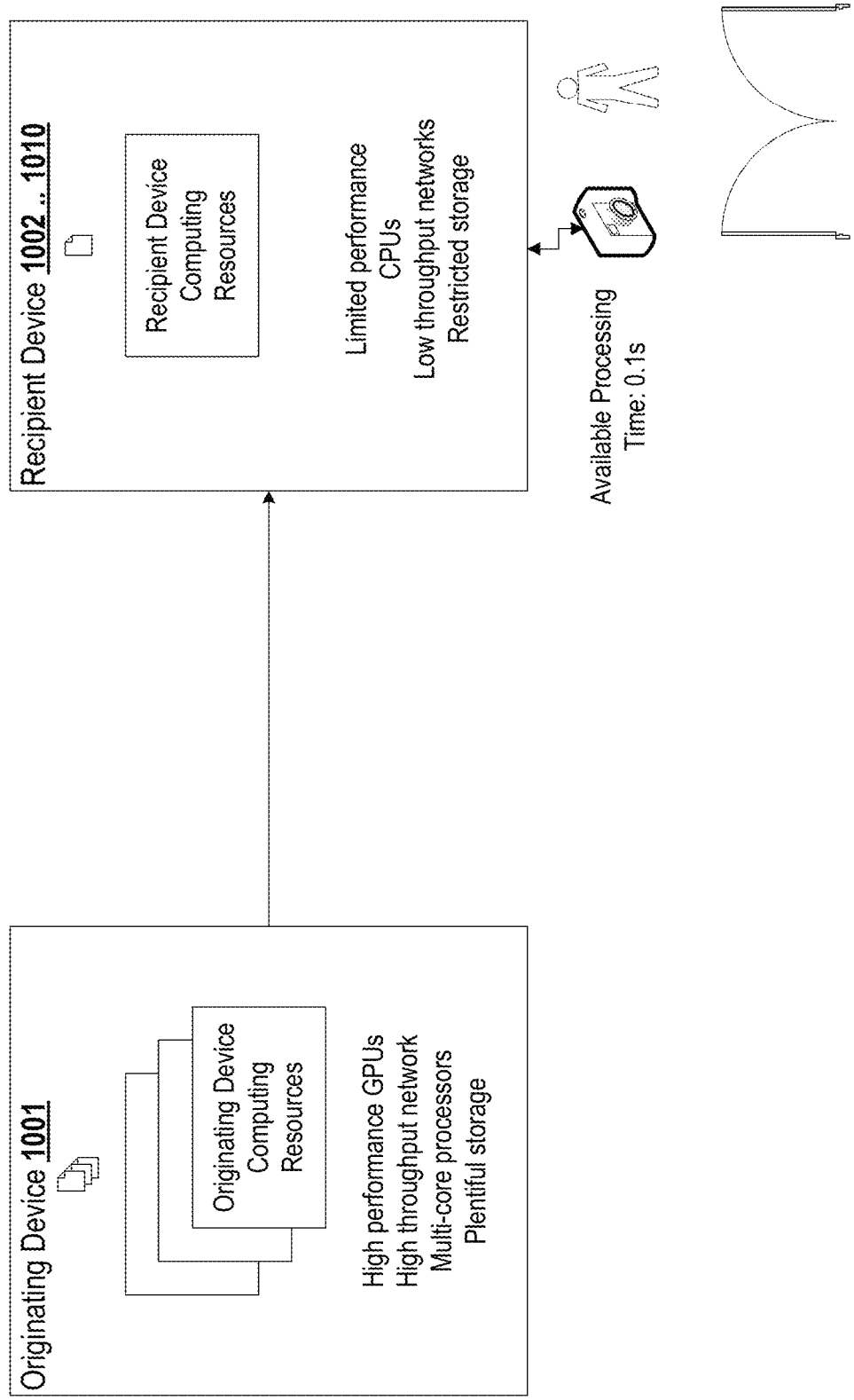
FIG. 1B is a block schematic illustrating the differing levels of resources between the originating device and the recipient devices, according to some embodiments.

FIG. 1B is a block schematic illustrating the differing levels of resources between the originating device and the recipient devices, according to some embodiments. As shown in this diagram, the originating device 1001 can, for example, include high performance computing elements, such as processors, graphics processors, networking infrastructure, as well as large volumes of available storage and memory.

The originating device 1001, for example, may be a supercomputer or a cluster of computing devices that reside at a data center or other centralized computing facility. Accordingly, originating device 1001 can be well suited for conducting training of a machine learning architecture.

However, recipient devices 1002 . . . 1010 may have limited computing resources by virtue of requirements for portability, positioning, orientation, economic feasibility, etc. The recipient devices 1002 . . . 1010 may also have limited available storage space (e.g., due to on-board memory constraints), and may not be able to utilize a fully sized machine learning architecture. The recipient devices 1002 . . . 1010 may also have limited processing time available, and a compressed machine learning architecture may also be able to operate faster (e.g., arrive at converged predictions) faster than a full-sized machine learning architecture.

Figure 1C:
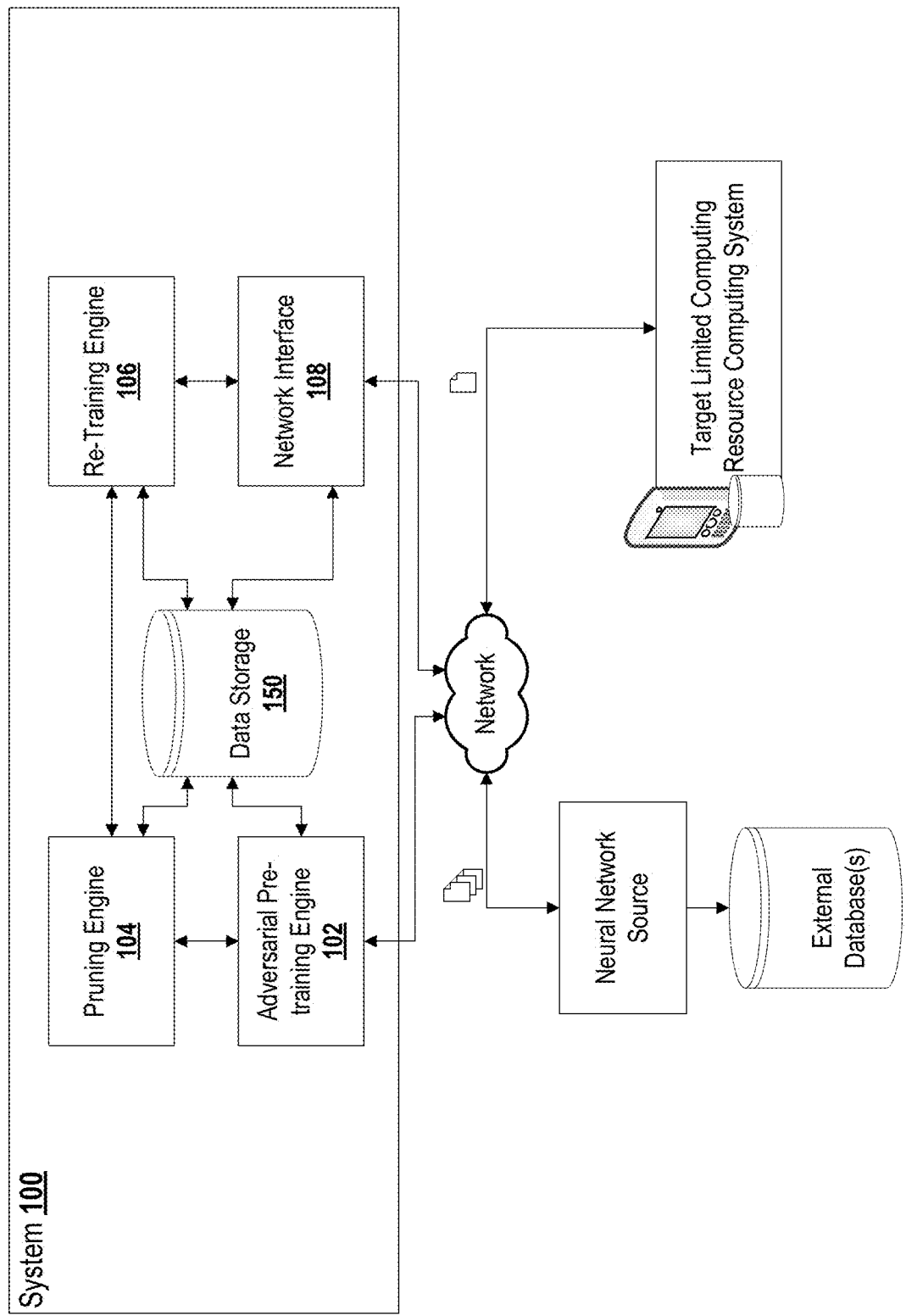
FIG. 1C is a block schematic of an example of a physical environment for a machine learning architecture (e.g., neural network pruning optimizer device), according to some embodiments.

FIG. 1C is a block schematic of an example of a physical environment for a machine learning architecture (e.g., neural network pruning optimizer device), according to some embodiments. A system 100 configured for processing machine learning architectures (e.g., neural networks), receiving an un-pruned neural network 120 (e.g., stored in the form of data sets) from a machine learning architecture (e.g., neural network) source 130 is provided.

System 100 includes an adversarial pre-training engine 102, a pruning engine 104, and a re-training engine 106. These engines are software (e.g., code segments compiled into machine code), hardware, embedded firmware, or a combination of software and hardware, according to various embodiments.

The adversarial pre-training engine 102 is configured to receive the data sets representative of the un-pruned neural network, and to adversarially pre-train the neural network with both original data as well as data perturbed by adversarial attacks for some epochs.

The pruning engine 104 is configured to prune "unimportant" weights or filters through criteria based on their magnitudes or other method (e.g., Taylor approximation of the loss function).

The re-training engine 106 is configured to then re-train the pruned neural network with both clean and perturbed data for more epochs.

The un-pruned neural network, the pruned neural network, rankings of filters and weights, and associated rules and adversarial approaches across multiple epochs are stored in data storage 150, which is configured to maintain one or more data sets, including data structures storing linkages and perturbations of data. Data storage 150 may be a relational database, a flat data storage, a non-relational database, among others.

A networking interface 108 is configured to transmit data sets representative of the re-trained pruned neural network, for example, to a target data storage or data structure. The target data storage or data structure may, in some embodiments, include a low-capacity/low-resource or mobile computing device (which requires a compressed neural network that still maintains a relatively high level of robustness).

The level of pruning and re-training may depend on constraints of the target data storage or data structure. For example, in some embodiments, the pruned neural network is pruned to a compression level. In other embodiments, the pruned neural network is pruned to a target accuracy level (e.g., 98%→96%). Combinations are contemplated as well.

The system 100, in some embodiments, is an information management and database system that maintains data storage of neural networks, and processes neural networks for transformation into pruned, relatively more robust neural networks.

Data structures are initialized, allocated, and maintained for storing the neural networks, and in some embodiments, a reduced size, compressed data structure is initialized and populated for storing the pruned neural network as an output for the system 100. The reduced size, compressed data structure requires less fields, weights, filters, and linkages than the original data structure of the un-pruned network, and may be adapted for high memory or processing efficiency.

For example, the system 100 of some embodiments is configured to output a pruned neural network for provisioning onto a mobile device with limited storage. The output, in this scenario, for example, could include a data payload encapsulating the reduced storage pruned neural network data structure, populated with the pruned neural network, among others. The encapsulated data payload may be provided in the form of an electronic file transfer message, fixated on a physical, non-transitory storage medium, among others.

Figure 2:
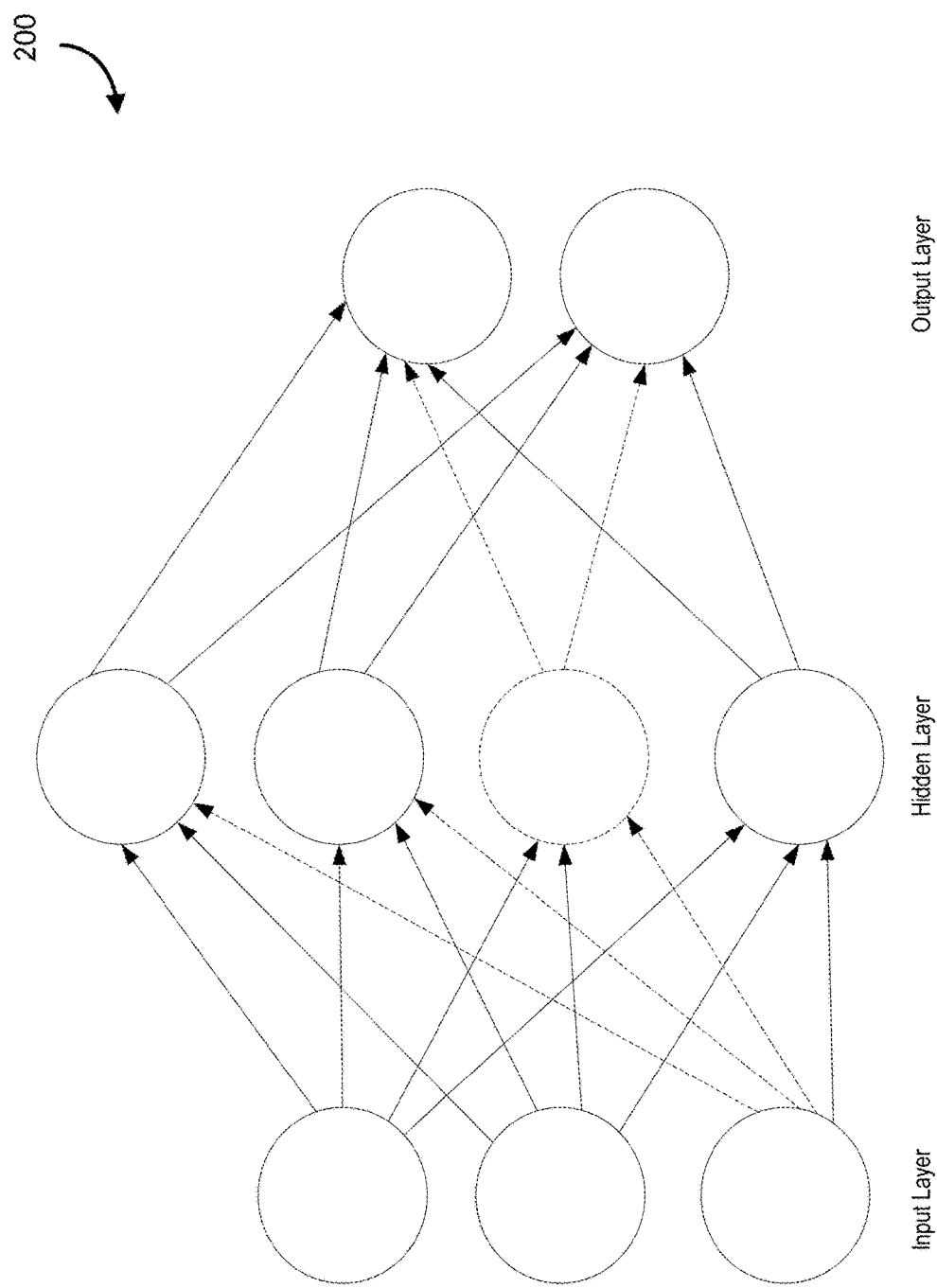
FIG. 2 is a block schematic of an example neural network, according to some embodiments.

FIG. 2 is a block schematic of an example neural network 200, according to some embodiments. In this example, the neural network includes an input layer, a hidden layer, and an output layer. A pruned approach reduces the number of non-zero parameters, and/or otherwise reduces the number of feature maps that are actively used in a neural network.

While accuracy may be reduced (including performance), the overall space required to store the neural network and/or the speed of inference and/or training may be improved. Applicants submit that the contributions are useful because of the popularity of compressed models—their security risk needs to be understood. To this end, Applicants investigate the interplay between neural network pruning and adversarial machine learning, and apply both white-box and black-box attacks to models pruned by weights or filters.

A challenge uncovered by Applicants is that pruned networks with high compression rates are extremely vulnerable to adversarial attacks, and Applicants have proposed methodologies and techniques to effectively utilize adversarial training on pruned models to make pruned neural networks more secure and robust.

Figure 3A:
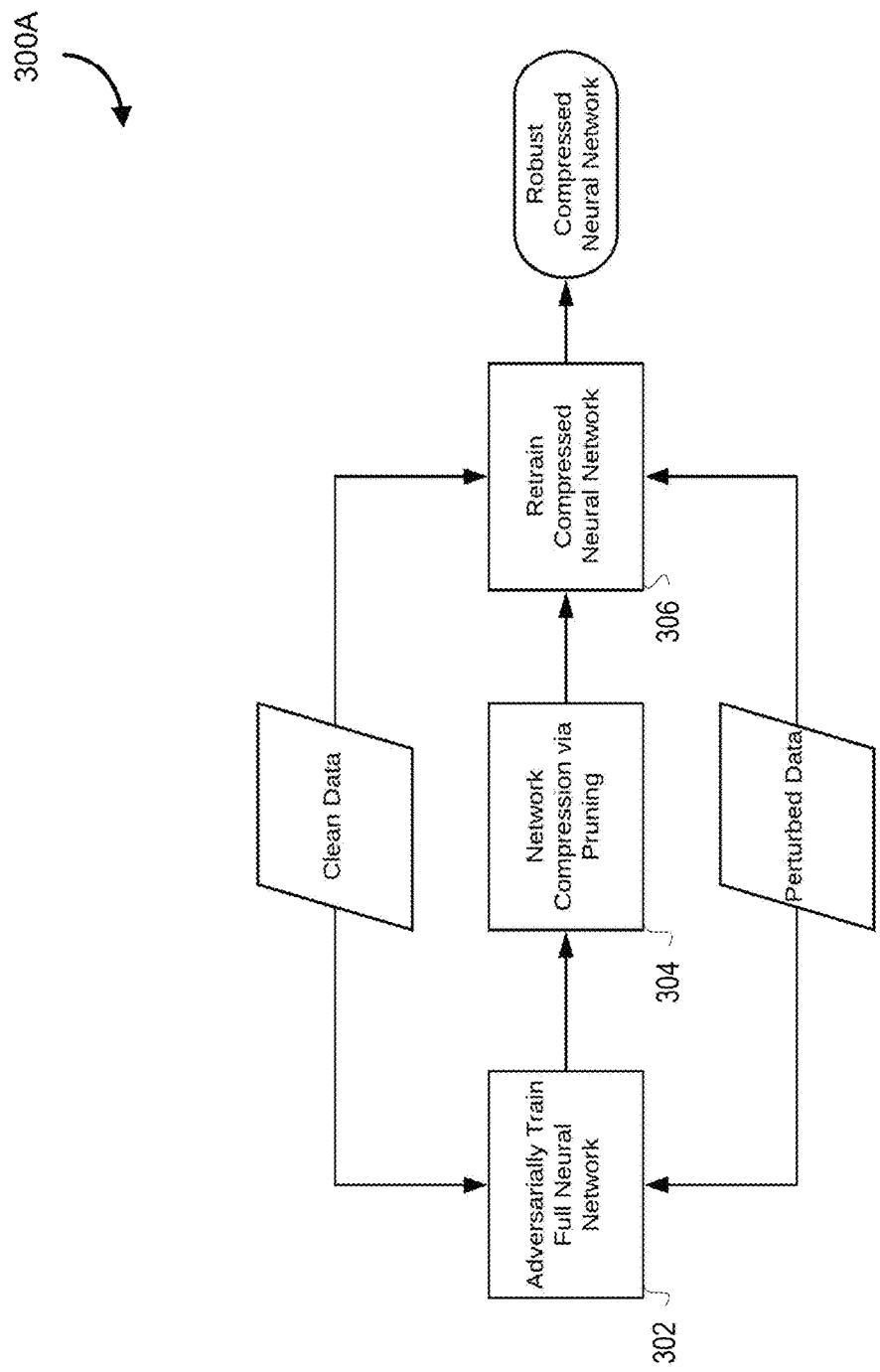
FIG. 3A is a method diagram of an example approach to pruning machine learning architectures to generate robust pruned neural networks, according to some embodiments.

FIG. 3A is a method diagram of an example approach to pruning machine learning architectures to generate robust pruned neural networks, according to some embodiments.

A procedure to train a robust compressed neural network is provided in an example method shown in FIG. 3A. The method is utilized to train a compressed neural network with high robustness.

There may be more, different, alternative, or varied steps, in various orders and the following steps are shown as a non-limiting example.

An original neural network (e.g., a pre-pruned network) may be provided, accessed, already residing on, or otherwise loaded into system 100. This neural network is, in some embodiments, not well suited for use in a target application where there may be limited computing resources, storage, or both. Rather a compressed neural network is desired for provisioning on the target application (e.g., smartphone). The compression may reduce the overall storage requirements and the need for fast processors, etc., at the cost of some accuracy of the neural network.

A method is described below to compress a neural network by pruning the neural network, the compression using specific steps and features to improve a robustness of the output neural network relative to certain types of attacks.

At step 302, the system adversarially pre-trains the original neural network with both original data as well as data perturbed by adversarial attacks for some epochs. Different approaches for adversarial pre-training are possible, such as Fast Gradient Sign Method (FGSM) training or Projected Gradient Descent (PGD) training, among others.

At step 304, the system is configured to prune "unimportant" weights or filters through criteria based on their magnitudes or other method (e.g., Taylor approximation of the loss function). For example, a Taylor expansion of the function represented by the machine learning architecture may be conducted, and lower importance elements and their corresponding representations may be pruned.

A ranking and/or a priority list can be generated for pruning, and in some embodiments, the pruning may involve pruning to a desired compression level or acceptable minimal accuracy level, or a combination of both.

At step 306, the system is configured to retrain the pruned neural network with both clean and perturbed data for more epochs.

The pruned neural network may be encapsulated into a data structure for transfer to the target application's computing device or data storage.

As described in some embodiments, the steps 302-306 can be iteratively conducted to reach a target compression level. The iterative approach, in some embodiments, may be advantageous as the overall level of resilience against adversarial attack is degraded at a lower rate relative to a single step compression approach (e.g., 100% directly to 30%, as opposed to 10% incremental approaches).

Figure 3B:
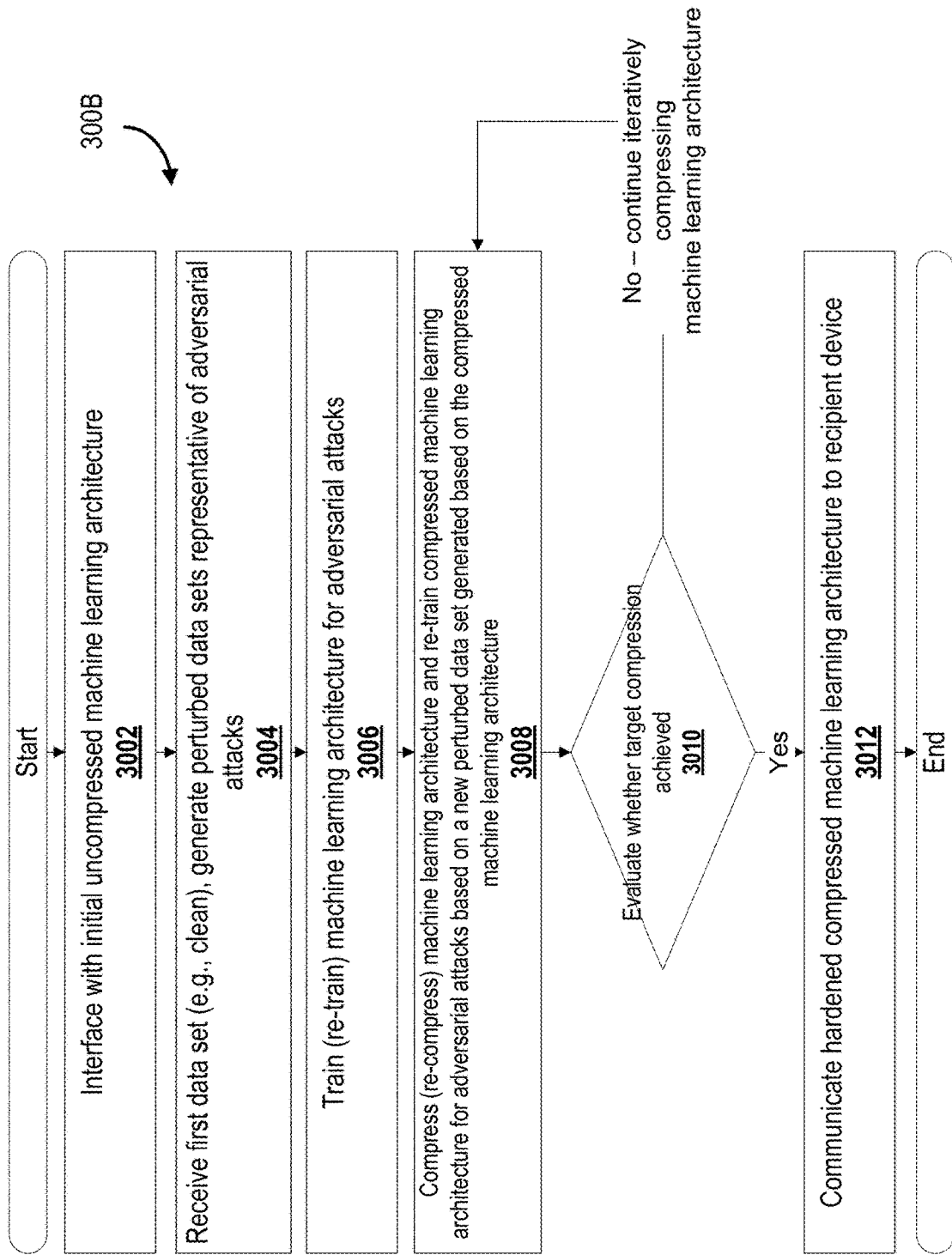
FIG. 3B is a method diagram of an example approach to pruning machine learning architectures to generate robust pruned neural networks, according to some embodiments.

FIG. 3B is a method diagram of an example approach to pruning machine learning architectures to generate robust pruned neural networks, according to some embodiments.

In FIG. 3B, method 300B is shown. An initial machine learning architecture is provided at 3002, along with a set of training data (e.g., clean training data) at 3004. An initial perturbed data set is generated, which is then used to train the initial machine learning architecture at 3006.

A compression step is used to reduce the overall size of the machine learning architecture at 3008, and a new set of perturbed data is generated, which is then used to re-train the compressed machine learning architecture.

The machine learning architecture is evaluated at 3010, for example, to assess the overall level of compression (e.g., desired level of degraded accuracy, or size, or combinations thereof), and the compression is iteratively conducted until the overall level of compression is reached at 3012.

The hardened machine learning architecture, stored, for example, in a reduced data structure is then encapsulated, distributed and/or deployed to various recipient devices for downstream usage. The reduced data structure may be better sized for transport across constrained networking infrastructures, and/or for storage on constrained data storage of the recipient devices.

Figure 3C:
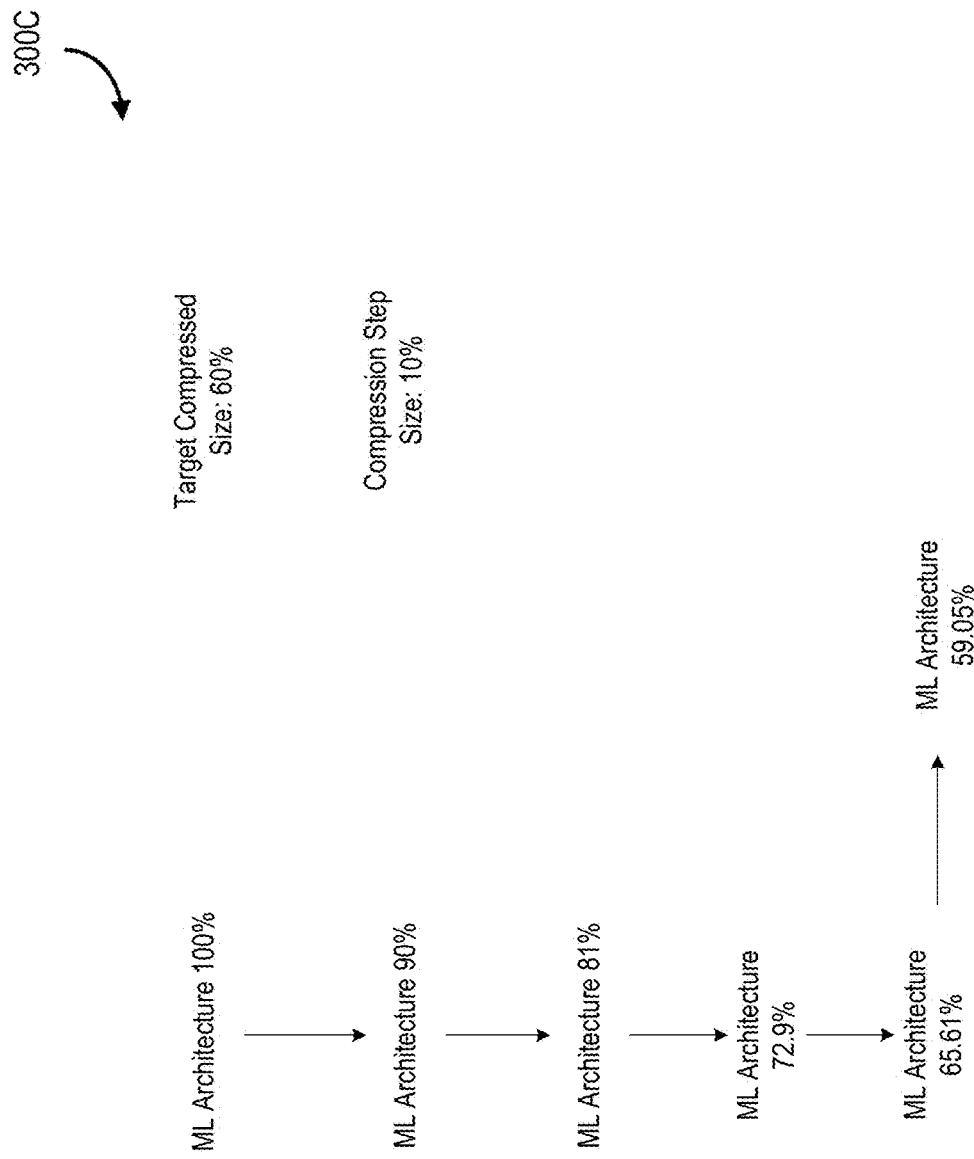
FIG. 3C is an example iterative method to apply step-wise compression to a machine learning architecture, according to some embodiments.

FIG. 3C is an example iterative method to apply step-wise compression to a machine learning architecture, according to some embodiments. In FIG. 3C, compressions of 10% are iteratively applied until the compression is less than 60% of the original size.

Figure 3D:
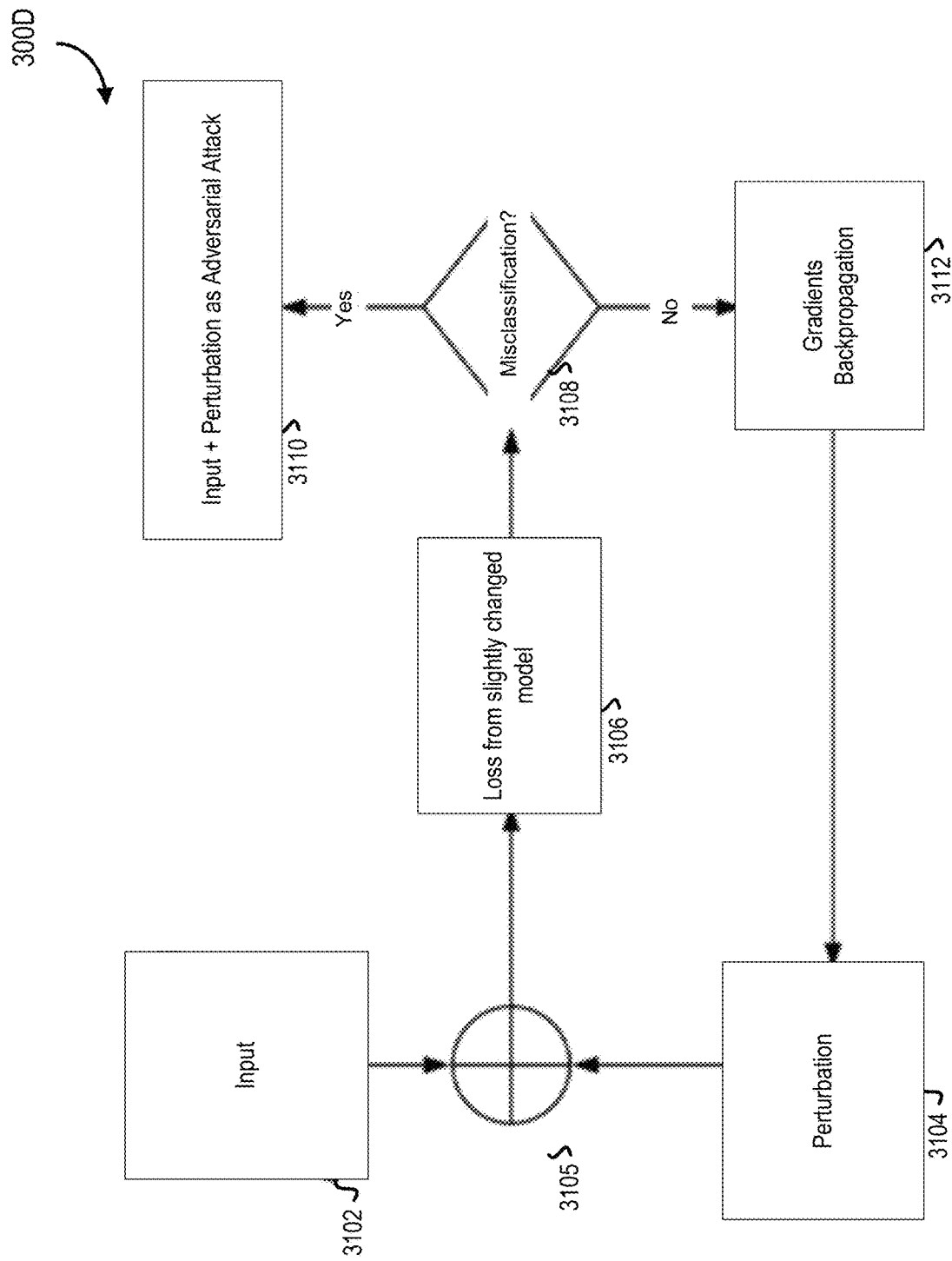
FIG. 3D is an example method shown for generating adversarial attacks, according to some embodiments.

FIG. 3D is an example method shown for generating adversarial attacks, according to some embodiments. The method 300D may be used, for example, to establish the perturbed examples for training the machine learning architectures of some embodiments.

Given an input image and a neural network model (e.g. a deep learning model), an effective attack can be crafted deterministically by solving an optimization problem maximizing the loss of the deep learning model over a small perturbation. This problem is typically solved by iterative and first-order methods (e.g., gradient descent), subject to certain constraints. This may require the gradients from the loss function (or a cost function) to be backpropagated to the input space to the neural network.

In some embodiments, in order to craft an attack for a given image and a neural network model, a constraint and non-convex optimization problem needs to be solved, which maximizes the loss of the neural network model with a perturbed input. The problem can be solved iteratively using first-order methods including the gradient descent and its derivatives.

For example, the projected gradient descent (PGD) attack solves the problem by using gradient descent and constrains the feasible region within a l-∞ ball. This optimization strategy can be accelerated with momentum. By adding momentum, the gradient descent almost always enjoys better converge rates on deep neural network models, because the parameter vector will build up velocity in any direction that has consistent gradient. The Carlini-Wagner attack tries to solve the optimization by using an alternative objective function that is easier for existing optimization methods. It has been shown that the Carlini-Wagner attack can successfully bypass the model distillation defence strategy.

The three attack methods are considered the most effective white-box attacks. However, they all require gradient information from the same model to solve the optimization problem, and therefore the optimization is deterministic. In order to train a neural network to be robust against these attacks, Applicant's research indicates that the neural network model can be trained using gradients generated from a distribution of models, where randomness is injected into the optimization. This way, adversarial examples can be crafted with stochastic gradient descent. It can better solve the optimization problem and generate stronger attacks.

In one embodiment, a method of training a neural network model includes injection of randomness in the model weight space during optimization. In each iteration of the optimization, the gradients to be backpropagated are generated from the model slightly perturbed in the weight space. For example, the neural network model may be trained iteratively using models selected from a model distribution. At each step, a different model is sampled from the model distribution. The model distribution may be generated by sampling neural network parameters.

This attack method can also be applied to protect privacy of the subject matter of images, by allowing it to bypass image analysis algorithms. Perturbed images, despite exposure to the public, cannot be analyzed automatically by algorithms collecting personal information from online images. Therefore this technique can be used to modify (e.g. perturb) an image in a manner that is not detectable to the human eye, but can prevent image analysis algorithms from analyzing the image properly.

An original neural network model (e.g., a pre-trained neural network) may be provided, accessed, already residing on, or otherwise loaded into a system 100. This pre-trained neural network is, in some embodiments, not robust enough against certain types of adversarial attacks.

In some embodiments, the system adversarially trains the original neural network with both original input data 3102 as well as perturbed data 3104 from a perturbed data set. Different approaches for adversarial training are possible, such as PGD, FGSM, among others.

At step 3105, the system is configured to train a neural network model with a combined input including original input data 3102, and one or more perturbed data 3104 for at least one training cycle, and likely for multiple cycles. In some embodiments, an original input data 3102 may be data sets representing a picture, and perturbed data 3104 may be one or more data sets representing disturbance or noise specifically configured to perturb the picture represented by input data 3102. The neural network model may then generate an output based on the combined input of input data 3102 and perturbed data 3104. In some embodiments, this output may represent a label generated by the neural network based on the combined input. For example, the output may be a classification of the perturbed image by the neutral network model.

At step 3106, the system may compute a gradient using a loss function based on the neural network model. In some embodiments, the gradient may be calculated based on one or more error values between the output of the neural network model based on the combined input (e.g. current network output) and the output of the neural network model based on input 3102 alone (e.g. expected network output). In some cases, each of the error values may be calculated for a respective neuron in the neural network, such that each neuron has an error value reflecting its individual contribution to the error.

At step 3108, the output from the neural network model may be compared to a label associated with the input data 3102. The label may be a correct classification for the input data 3102, without the perturbed data 3104, and in some embodiments may be previously generated or predicted by the neural network model. The comparison is performed to check if the perturbed data 3104 causes misclassification of the input data 3102 by the neural network data.

At step 3110, if and when the output from the neural network model is different from the label associated with the input data (i.e., misclassified), the system may save the combined data of input data 3102 and the perturbed data 3104 as successful input for an attack.

At step 3112, if and when the output from the neural network model is identical to the label associated with the input data (i.e., not misclassified), the system may update the perturbed data set with the computed gradient from the neural network model. The gradient may be back propagated into the input space (e.g., through perturbed data set), distributed back into the network layers within the neural network, and used in the calculation or adjustment of the weights of neurons within the neutral network. A modified neural network model (a "modified model") with different weights than a previous neural network model may thus be generate based on the gradient.

In some embodiments, the system may proceed to iteratively train the neural network model with a perturbed data from the updated perturbed data set in each training cycle.

In some embodiments, the modified model may be selected from a model distribution. The model distribution may be generated by sampling neural network parameters. In some cases, during each training epoch or cycle, the modified model may vary from the neural network model in weight space. The neural network model may be trained iteratively, each time using a different modified model from the model distribution, and thereby computing a gradient using a loss function based on a different modified model during each training cycle.

In some embodiments, the system may be configured to train the neural network in an epoch, in which a plurality of combined input, each including an input data 3102 and a perturbed data 3104, are sent through the neural network in one training cycle.

The trained neural network may be encapsulated into a data structure for transfer to the target application's computing device or data storage.

Experimental Verification

To demonstrate the effectiveness of the approach, Applicants conduct experiments on the MNIST digit recognition dataset. The tasks is an image classification task in computer vision—given a picture of a single handwritten image (from 0 to 9), the neural network needs to tell which number is it. Applicants trained the models based on 50,000 training examples, and test the performance of the model on 10,000 test images. The baseline model has an accuracy of over 99%.

Then Applicants pruned the "unimportant" weights or filters of the baseline model to compress its size. Applicants sort and rank the weights or filters by their magnitudes, and prune the smallest ones.

The accuracy will not drop until a very high compression rate, showing that currently widely used neural networks have significant redundancy.

Applicants attack these models using three attack methods: the fast gradient sign method (FGSM) with different epsilons, projected gradient descent method (PGD), and the black-box method based on Jacobian data augmentation.

These attacks are applied to the test data with the intention to fool the model by causing it to misclassify as many as possible. It is shown in Table 1 and 2 that even through the accuracy on original data stays high up to a very high compression rate, all three attack methods will cause a significantly larger accuracy drop.

The accuracy drop is extremely severe when the compression rate is high—previously one would prefer the smallest model without significant accuracy loss.

For example, the model with 96% of weight pruned is compressed by 25 times but still has a test accuracy of 98.9% comparing to 99.0% for the unpruned model. Nevertheless, its accuracy against adversarially perturbed data is significantly lower than the original model. Besides, no model can withstand the strongest PGD attacks.

Using the proposed approach of some embodiments, Applicants are able to train compressed neural networks with high robustness while keeping high accuracy on the original data.

Applicants apply two adversarial training methods: FGSM training (Table 3 & 4) and PGD training (Table 5 & 6). Note that the former is computationally cheaper but do not produces models as robust as the later method.

For examples, in Table 5 and 6 the adversarially trained models by FGSM do not have any defence against PGD attacks. Applicants mark that the method of choice depends on the user based on their computation resources.

TABLE 1

Accuracy of weight-pruned networks on original or perturbed test data.

| Parameters Pruned | Original Images | FGSM epsilon = 0.1 | FGSM epsilon = 0.2 | FGSM epsilon = 0.3 | PGD | Black-Box |
|---|---|---|---|---|---|---|
| 0% | 99.0% | 73.4% | 30.3% | 11.8% | 0.8% | 62.7% |
| 30% | 99.1% | 73.3% | 30.8% | 13.0% | 0.8% | 61.9% |
| 50% | 99.0% | 68.8% | 27.6% | 11.8% | 1.0% | 56.2% |
| 70% | 99.0% | 70.8% | 26.7% | 10.0% | 0.8% | 62.9% |
| 90% | 99.0% | 59.8% | 21.2% | 7.1% | 0.7% | 56.6% |
| 92% | 99.0% | 51.4% | 18.5% | 7.4% | 0.7% | 63.9% |
| 94% | 99.1% | 41.9% | 12.2% | 4.5% | 0.6% | 62.8% |
| 96% | 98.9% | 28.9% | 5.1% | 1.9% | 0.7% | 58.6% |
| 98% | 98.2% | 15.5% | 1.6% | 1.2% | 0.9% | 45.3% |
| 99% | 96.4% | 10.3% | 2.3% | 2.2% | 1.7% | 30.1% |

TABLE 2

Accuracy of filter-pruned networks on original or perturbed test data.

| Parameters Pruned | Original Images | FGSM epsilon = 0.1 | FGSM epsilon = 0.2 | FGSM epsilon = 0.3 | PGD | Black-Box |
|---|---|---|---|---|---|---|
| 0% | 99.0% | 72.0% | 31.8% | 14.8% | 0.9% | 57.3% |
| 40% | 99.1% | 73.8% | 40.3% | 23.5% | 2.0% | 62.7% |
| 50% | 99.0% | 65.0% | 28.5% | 15.3% | 0.8% | 59.7% |
| 55% | 98.8% | 58.7% | 28.1% | 17.9% | 0.7% | 57.1% |
| 60% | 97.6% | 27.3% | 5.4% | 3.6% | 2.2% | 26.6% |
| 65% | 94.8% | 22.1% | 11.5% | 9.2% | 5.3% | 21.5% |
| 70% | 94.5% | 21.5% | 8.7% | 7.2% | 4.9% | 21.2% |

TABLE 3

Accuracy of adversarially trained and weight-pruned networks using FGSM attacks on original or perturbed test data.

| Parameters Pruned | Original Images | FGSM epsilon = 0.1 | FGSM epsilon = 0.2 | FGSM epsilon = 0.3 | PGD | Black-Box |
|---|---|---|---|---|---|---|
| 0% | 99.3% | 96.9% | 91.0% | 78.4% | 11.4% | 93.5% |
| 30% | 99.3% | 97.0% | 91.3% | 81.0% | 8.1% | 94.8% |
| 50% | 99.3% | 97.1% | 90.6% | 76.4% | 7.8% | 93.9% |
| 70% | 99.2% | 97.1% | 90.6% | 76.4% | 7.8% | 91.5% |
| 90% | 99.1% | 95.3% | 82.2% | 50.4% | 3.8% | 87.9% |
| 92% | 98.9% | 96.0% | 87.1% | 68.5% | 3.8% | 88.4% |
| 94% | 98.7% | 95.9% | 83.3% | 60.8% | 3.6% | 87.0% |
| 96% | 98.3% | 94.2% | 83.1% | 62.3% | 2.7% | 66.0% |

TABLE 3-continued

Accuracy of adversarially trained and weight-pruned networks using FGSM attacks on original or perturbed test data.

| Parameters Pruned | Original Images | FGSM epsilon = 0.1 | FGSM epsilon = 0.2 | FGSM epsilon = 0.3 | PGD | Black-Box |
|---|---|---|---|---|---|---|
| 98% | 96.7% | 89.6% | 68.5% | 28.4% | 2.1% | 66.0% |
| 99% | 94.0% | 88.2% | 75.8% | 48.3% | 8.2% | 56.9% |

TABLE 4

Accuracy of adversarially trained and filter-pruned networks using FGSM attacks on original or perturbed test data.

| Parameters Pruned | Original Images | FGSM epsilon = 0.1 | FGSM epsilon = 0.2 | FGSM epsilon = 0.3 | PGD | Black-Box |
|---|---|---|---|---|---|---|
| 0% | 99.3% | 97.1% | 91.2% | 78.5% | 8.5% | 93.8% |
| 40% | 99.1% | 96.6% | 90.3% | 77.4% | 12.8% | 93.4% |
| 50% | 99.2% | 96.7% | 89.4% | 73.5% | 7.4% | 92.1% |
| 55% | 99.1% | 96.3% | 88.3% | 70.3% | 9.3% | 92.0% |
| 60% | 98.9% | 95.8% | 87.3% | 69.4% | 6.2% | 92.1% |
| 65% | 98.2% | 93.7% | 80.5% | 52.5% | 5.1% | 87.5% |
| 70% | 97.3% | 91.6% | 77.6% | 44.0% | 8.2% | 81.3% |

TABLE 5

Accuracy of adversarially trained and weight-pruned networks using PGD attacks on original or perturbed test data.

| Parameters Pruned | Original Images | FGSM epsilon = 0.1 | FGSM epsilon = 0.2 | FGSM epsilon = 0.3 | PGD | Black-Box |
|---|---|---|---|---|---|---|
| 0% | 98.9% | 96.6% | 94.8% | 92.5% | 89.8% | 97.1% |
| 30% | 98.7% | 96.4% | 94.3% | 91.7% | 90.7% | 97.1% |
| 50% | 98.7% | 96.3% | 94.3% | 91.9% | 89.6% | 96.9% |
| 70% | 98.8% | 96.2% | 93.7% | 91.1% | 88.8% | 96.8% |
| 90% | 98.0% | 94.9% | 92.3% | 88.5% | 86.6% | 95.6% |
| 92% | 98.1% | 93.9% | 90.7% | 86.4% | 85.8% | 95.1% |
| 94% | 97.8% | 92.8% | 89.5% | 83.9% | 85.3% | 94.6% |
| 96% | 97.4% | 92.7% | 87.2% | 78.8% | 84.3% | 94.1% |
| 98% | 96.5% | 87.0% | 81.2% | 72.3% | 84.0% | 93.2% |
| 99% | 94.9% | 86.1% | 81.4% | 73.8% | 83.6% | 89.9% |

TABLE 6

Accuracy of adversarially trained and filter-pruned networks using PGD attacks on original or perturbed test data.

| Parameters Pruned | Original Images | FGSM epsilon = 0.1 | FGSM epsilon = 0.2 | FGSM epsilon = 0.3 | PGD | Black-Box |
|---|---|---|---|---|---|---|
| 0% | 98.7% | 96.8% | 95.1% | 92.4% | 88.3% | 97.2% |
| 40% | 98.1% | 95.7% | 93.0% | 89.3% | 87.0% | 95.8% |
| 50% | 98.3% | 94.8% | 91.5% | 87.0% | 87.3% | 96.3% |
| 55% | 97.7% | 94.0% | 90.6% | 85.4% | 86.0% | 95.8% |
| 60% | 97.6% | 94.0% | 90.0% | 85.2% | 85.3% | 95.8% |
| 65% | 97.7% | 93.7% | 89.6% | 84.1% | 83.5% | 95.4% |
| 70% | 97.2% | 91.8% | 86.9% | 79.9% | 79.2% | 95.2% |

A second set of experimentation was conducted by Applicants. In this example, adversarial training is performed along with the network pruning procedure. Perturbations are generated with FGSM and PGD method, and both clean and perturbed data are fed into the model in each epoch to ensure high accuracy on the natural images.

The ε of FGSM training is sampled randomly from a truncated Gaussian distribution in [0; $\varepsilon_{max}$] with the standard deviation of $\sigma=\varepsilon_{max}/2$. In this experiment, set $\varepsilon_{max}=0.3$. PGD training contains examples generated with 40 steps of size 0.01 in a $l^\infty$ ball with ε=0.3.

TABLE 7

Accuracy of pruned networks by weight or filter pruning on clean or perturbed test data.

| Parameters pruned | Natural images | FGSM ∈ = 0.1 | FGSM ∈ = 0.2 | FGSM ∈ = 0.3 | PGD | Papernot's black-box | Trade-off |
|---|---|---|---|---|---|---|---|
| | | | FGSM Training | | | | |
| 0% | 99.2% | 97.9% | 94.0% | 84.7% | 0.5% | 89.2% | — |
| weight - 96% | 99.0% | 94.8% | 83.5% | 59.0% | 2.2% | 79.6% | high compression |
| weight - 80% | 99.2% | 98.2% | 94.7% | 85.9% | 0.2% | 89.6% | high robustness |
| filter - 70% | 98.9% | 94.1% | 82.3% | 60.1% | 1.7% | 82.5% | high compression |
| filter - 60% | 99.0% | 97.8% | 93.6% | 83.0% | 0.4% | 85.7% | high robustness |
| | | | PGD Training | | | | |
| 0% | 99.0% | 97.3% | 95.6% | 93.5% | 92.5% | 96.8% | — |
| weight - 94% | 98.8% | 95.6% | 94.2% | 91.9% | 90.6% | 95.6% | high compression |
| weight - 85% | 99.0% | 96.9% | 95.3% | 93.3% | 92.0% | 96.0% | high robustness |
| filter - 65% | 98.9% | 89.8% | 86.9% | 82.3% | 75.4% | 87.5% | high compression |
| filter - 40% | 99.0% | 94.9% | 93.1% | 90.8% | 87.3% | 94.1% | high robustness |

Table 7, shows that adversarial training is a sound defense strategy for pruned models. It is observed that highly pruned networks is able to become considerably robust even though it is much less parameterized, whereas models with comparable size has previously been shown not trainable adversarially from scratch.

Compared to filter pruning, weight pruning allows more compression because it has greater flexibility on choosing which part of the network to be pruned. The results also confirm the observations by that FGSM training is suboptimal, and PGD trains more robust models. It is evident in Table 7 that FGSM-training cannot guard against PGD attacks. However, PGD slows down training by a factor equals to the number of iterations used.

Figure 3E:
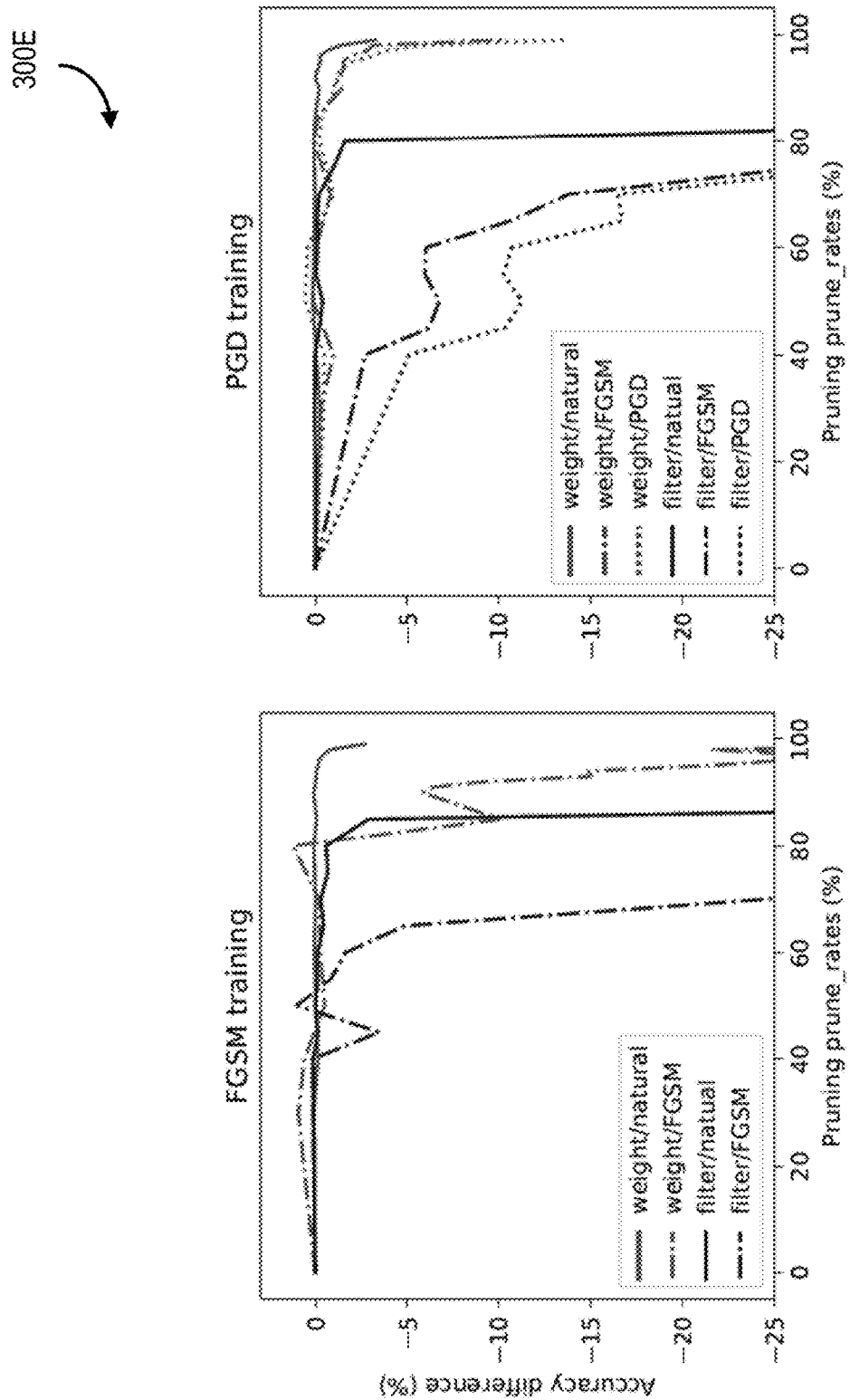
FIG. 3E is a set of graphs illustrative of accuracy differences between the pruned and original model, on both natural and perturbed images, according to some embodiments.

FIG. 3E is a set of graphs illustrative of accuracy differences between the pruned and original model, on both natural and perturbed images, according to some embodiments. In illustration 300E, FGSM training is shown on the left, and PGM is shown on the right. FGSM attacks shown here are with ε=0.3.

It is noticeable in FIG. 3E that both the classification accuracy and robustness of the model drop as the compression rate increases. However, robustness drops earlier, which means less compression rate is allowed if we want to maintain the original robustness other than just the original classification accuracy. We suspect the reason is that adversarial training requires additional capacity not just to classify natural data but also separate the $l^\infty$-norm ε-ball around each data point. As the network gets pruned more and more, it becomes less capable of modeling such complex decision boundaries.

Therefore, the model cannot be highly robust and highly pruned at the same time with FGSM nor PGD training. As shown in Table 7, one can select a highly compressed model but less robust, and vice versa.

Another experiment was conducted using CIFAR-10 data. Applicants also conduct our experiments using a wide residual network (WRN) on CIFAR-10 dataset and have observed similar trends. The WRN has 28 layers and a widen factor of 4.

Applicants perform both FGSM and PGD training and feed both clean and perturbed data into the model in each epoch. The ε of FGSM training is sampled randomly from a truncated Gaussian distribution in [0, $\varepsilon_{max}$] with the standard deviation of $\sigma=\varepsilon_{max}/2$, where $\varepsilon_{max}=8$. The PGD training contains examples generated with a step size of 2 within a $l^\infty$ ball with ε=8 for 7 iterations. Note that on CIFAR-10, adversarial training will reduce the prediction accuracy on the natural images, especially the PGD training.

It is interesting that in the PGD training case when the network is mildly pruned (less than 50% of the parameters), the network is slightly more accurate and more robust than the original one.

Meanwhile, when 80% to 94% of weights are pruned, the PGD trained network exhibits higher robustness than the original; however, its classification accuracy drops at the same time. Applicants suspect it is because for such a less parameterized network, more when capacity is allocated on including the perturbed data, there is less for classifying natural images.

TABLE 8

Accuracy of pruned WRN-28-4 by weight or filter pruning on clean or perturbed test data.

| Parameters pruned | Natural images | FGSM ∈ = 0.1 | FGSM ∈ = 0.2 | FGSM ∈ = 0.3 | PGD |
|---|---|---|---|---|---|
| | | Standard Training | | | |
| 0% | 95.2% | 66.1% | 53.0% | 42.4% | 0.5% |
| weight - 94% | 94.7% | 54.9% | 33.1% | 24.0% | 0.0% |
| filter - 60% | 94.5% | 49.9% | 30.0% | 21.7% | 0.0% |
| | | FGSM Training | | | |
| 0% | 91.2% | 86.7% | 76.2% | 55.4% | 41.5% |
| weight - 94% | 90.5% | 85.0% | 73.0% | 44.9% | 31.6% |
| filter - 60% | 91.4% | 85.7% | 72.4% | 42.2% | 27.5% |
| | | PGD Training | | | |
| 0% | 87.3% | 83.3% | 74.3% | 55.1% | 47.1% |
| weight - 70% | 87.5% | 83.0% | 74.4% | 55.2% | 47.3% |
| filter - 50% | 87.3% | 83.7% | 75.7% | 55.1% | 47.8% |

Figure 3F:
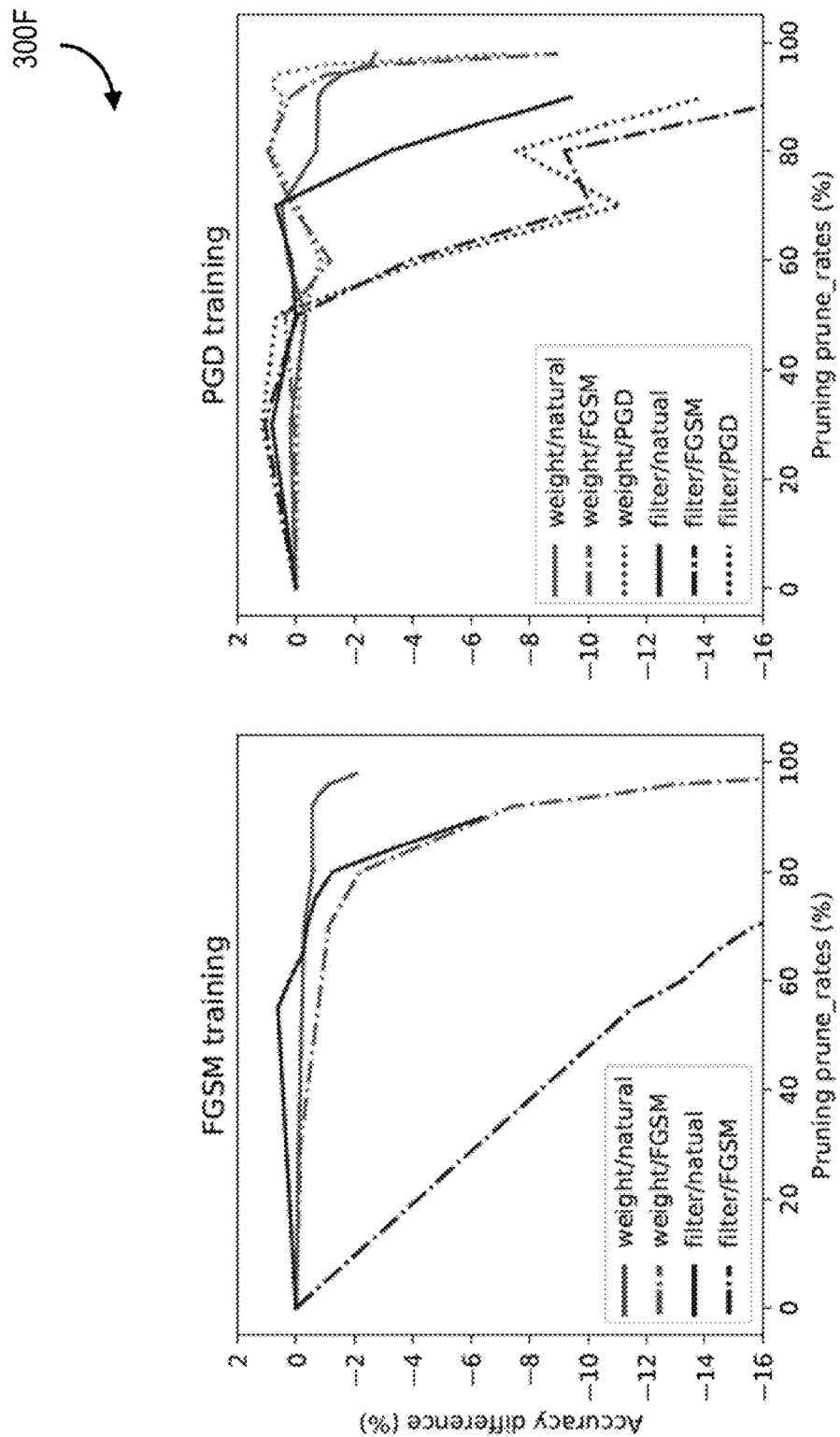
FIG. 3F is a set of graphs illustrative of accuracy differences between the pruned and original model, on both natural and perturbed images, in respect of the CIFAR-10 data set, according to some embodiments.

FIG. 3F is a set of graphs illustrative of accuracy differences between the pruned and original model, on both natural and perturbed images, in respect of the CIFAR-10 data set, according to some embodiments.

In illustration 300F, FGSM training is shown on the left, and PGM is shown on the right.

Figure 4:
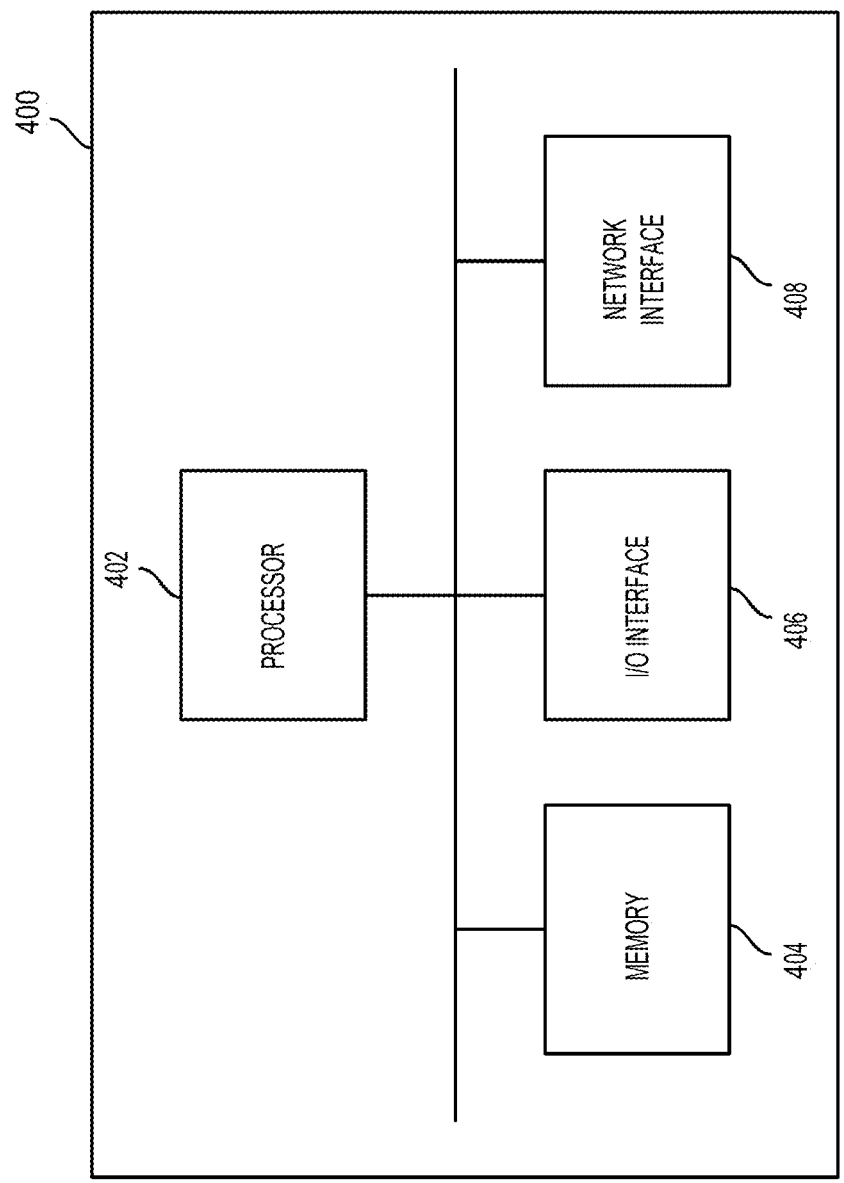
FIG. 4 is a block schematic diagram of an example computing device, according to some embodiments.

FIG. 4 is a block schematic diagram of an example computing device, according to some embodiments. There is provided a schematic diagram of computing device 400, exemplary of an embodiment. As depicted, computing device 400 includes at least one processor 402, memory 404, at least one I/O interface 406, and at least one network interface 408. The computing device 400 is configured as a machine learning server adapted to dynamically maintain one or more neural networks.

Each processor 402 may be a microprocessor or microcontroller, a digital signal processing (DSP) processor, an integrated circuit, a field programmable gate array (FPGA), a reconfigurable processor, a programmable read-only memory (PROM), or combinations thereof.

Memory 404 may include a computer memory that is located either internally or externally such as, for example, random-access memory (RAM), read-only memory (ROM), compact disc read-only memory (CDROM), electro-optical memory, magneto-optical memory, erasable programmable read-only memory (EPROM), and electrically-erasable programmable read-only memory (EEPROM), Ferroelectric RAM (FRAM).

Each I/O interface 406 enables computing device 400 to interconnect with one or more input devices, such as a keyboard, mouse, camera, touch screen and a microphone, or with one or more output devices such as a display screen and a speaker.

Embodiments of methods, systems, and apparatus are described through reference to the drawings.

The embodiments of the devices, systems and methods described herein may be implemented in a combination of both hardware and software. These embodiments may be implemented on programmable computers, each computer including at least one processor, a data storage system (including volatile memory or non-volatile memory or other data storage elements or a combination thereof), and at least one communication interface.

Program code is applied to input data to perform the functions described herein and to generate output information. The output information is applied to one or more output devices. In some embodiments, the communication interface may be a network communication interface. In embodiments in which elements may be combined, the communication interface may be a software communication interface, such as those for inter-process communication. In still other embodiments, there may be a combination of communication interfaces implemented as hardware, software, and combination thereof.

Throughout the foregoing discussion, numerous references will be made regarding servers, services, interfaces, portals, platforms, or other systems formed from computing devices. It should be appreciated that the use of such terms is deemed to represent one or more computing devices having at least one processor configured to execute software instructions stored on a computer readable tangible, non-transitory medium. For example, a server can include one or more computers operating as a web server, database server, or other type of computer server in a manner to fulfill described roles, responsibilities, or functions.

The technical solution of embodiments may be in the form of a software product. The software product may be stored in a non-volatile or non-transitory storage medium, which can be a compact disk read-only memory (CD-ROM), a USB flash disk, or a removable hard disk. The software product includes a number of instructions that enable a computer device (personal computer, server, or network device) to execute the methods provided by the embodiments.

The embodiments described herein are implemented by physical computer hardware, including computing devices, servers, receivers, transmitters, processors, memory, displays, and networks. The embodiments described herein provide useful physical machines and particularly configured computer hardware arrangements.

Although the embodiments have been described in detail, it should be understood that various changes, substitutions and alterations can be made herein.

Moreover, the scope of the present application is not intended to be limited to the particular embodiments of the process, machine, manufacture, composition of matter, means, methods and steps described in the specification.

As can be understood, the examples described above and illustrated are intended to be exemplary only.

What is claimed is:

1. A computer implemented system for hardening a compressed machine learning architecture for resilience against one or more potential adversarial attacks, the system including a originating device including originating device data storage and at least one originating device processor and a recipient device including recipient device data storage, and at least one recipient device processor, the system comprising:

the at least one originating device processor configured to provide:
    a first machine learning architecture maintained on the originating device data storage;
    an adversarial attack generation perturbation engine configured to receive a first training data set and to generate a perturbed training data set based on the first training data set;
    a training engine configured to train, using the perturbed training data set, the first machine learning architecture to establish a trained machine learning architecture; and
    an architecture compression engine configured to prune one or more elements of the machine learning architecture to generate an compressed machine learning architecture;
    wherein the training engine is also configured to generate the hardened compressed machine learning architecture by training, the compressed machine learning architecture using the perturbed training data set;
the recipient device data storage configured to receive the hardened compressed machine learning architecture; and
the at least one recipient device processor configured to utilize the hardened compressed machine learning architecture for generating one or more data structures representative of one or more prediction outputs, the hardened compressed machine learning architecture hardened against the one or more potential adversarial attacks.

2. The system of claim 1, wherein the training engine is configured to
    receive a compression data storage target value between an initial machine learning architecture and a target hardened compressed machine learning architecture;
    determine a compression step size based at least on the compression data storage target value, the compression step size controlling an extent of compression between the machine learning architecture and the compressed machine learning architecture; and iterate the training of the machine learning architecture, compressing of the machine learning architecture, and establishing the hardened compressed machine learning architecture, for a plurality of iterations, the compressing of the machine learning architecture iteratively conducted based on the determined compression step size.

3. The system of claim 2, wherein the system includes a plurality of recipient devices, each recipient device associated with a compression data storage target value, and wherein the plurality of recipient devices includes at least two recipient devices associated with different compression data storage target values.

4. The system of claim 1, wherein the system includes a plurality of recipient devices, and each recipient device of the plurality of recipient devices is electronically coupled to a backend server, each recipient device configured to transmit at least one of the one or more data structures representative of the one or more prediction outputs to the backend server.

5. The system of claim 4, wherein the plurality of recipient devices includes at least two camera devices configured to generated predictions of one or more characteristics associated with objects captured in corresponding image data, and the backend server is configured to interoperate with a backend data storage to generate one or more labels associating each of the objects with a stored object profile.

6. The system of claim 5, wherein the one or more objects include one or more individuals, and the one or more labels include one or more data elements generated based on the corresponding one or more stored object profiles.

7. The system of claim 6, wherein the one or more data elements include one or more identify validation challenge responses associated with the corresponding individual of the one or more individuals.

8. The system of claim 7, wherein an access control device is configured to actuate one or more access control mechanisms in response to the one or more identify validation challenge responses.

9. The system of claim 8, wherein the one or more access control mechanisms include at least one of a physical access control mechanism or a virtual access control mechanism.

10. The system of claim 4, wherein the plurality of recipient devices are individual sub-processors of a parallel processing device, and the backend server is a processing coordinator device configured to receive the at least one of the one or more data structures representative of the one or more prediction outputs and to generate one or more consolidated outputs based on the one or more prediction outputs.

11. A computer implemented method for hardening a compressed machine learning architecture for resilience against one or more adversarial attacks, the method comprising:

receiving a first training data set;
generating a perturbed training data set based on the first training data set;
training, using the perturbed training data set, an machine learning architecture to establish a trained machine learning architecture;
compressing the machine learning architecture to generate an compressed machine learning architecture; and
training, using the perturbed training data set, the compressed machine learning architecture to establish the hardened compressed machine learning architecture.

12. The method of claim 11, wherein the method comprises:

receiving a compression data storage target value between an initial machine learning architecture and a target hardened compressed machine learning architecture;
determining a compression step size based at least on the compression data storage target value, the compression step size controlling an extent of compression between the machine learning architecture and the compressed machine learning architecture; and
iterating the training of the machine learning architecture, compressing of the machine learning architecture, and establishing the hardened compressed machine learning architecture, for a plurality of iterations, the compressing of the machine learning architecture iteratively conducted based on the determined compression step size.

13. The method of claim 12, wherein the compression step size is determined based on a pre-defined maximum compression metric.

14. The method of claim 12, wherein the compression step size is approximately 10%.

15. The method of claim 11, wherein the compressing of the machine learning architecture to generate the compressed machine learning architecture is conducted through pruning one or more weights or filters based at least on one more criteria.

16. The method of claim 15, wherein the one or more criteria include at least one of magnitudes of the one or more weights or filters or Taylor approximation of a loss function of the machine learning architecture.

17. The method of claim 11, wherein the training steps are conducted using at least one of Fast Gradient Sign Method (FGSM) training or Projected Gradient Descent (PGD) training.

18. The method of claim 12, wherein the compression data storage target value is a value selected from: approximately: 30%, 50%, 70%, 90%, 92%, 94%, 96%, 98%, and 99%.

19. The method of claim 11, wherein the perturbed training data set is generated based on a stochastic gradient descent.

20. The method of claim 19, wherein the stochastic gradient descent is generated based on gradients generated from a distribution of models, where randomness is injected into an optimization.

21. A computer readable medium storing machine interpretable instructions, which when executed, cause a processor to perform steps of a computer implemented method for hardening a compressed machine learning architecture for resilience against one or more adversarial attacks, the method comprising:

receiving a first training data set;
generating a perturbed training data set based on the first training data set;
training, using the perturbed training data set, an machine learning architecture to establish a trained machine learning architecture;
compressing the machine learning architecture to generate an compressed machine learning architecture; and
training, using the perturbed training data set, the compressed machine learning architecture to establish the hardened compressed machine learning architecture.

22. A originating device for hardening a compressed machine learning architecture for resilience against one or more potential adversarial attacks, the originating device including at least one originating device processor, the originating device in electronic communication with a recipient device including recipient device data storage, and at least one recipient device processor, the originating device comprising:

the at least one originating device processor configured to interface with a first machine learning architecture, and to provide:
an adversarial attack generation perturbation engine configured to receive a first training data set and to generate a perturbed training data set based on the first training data set;
a training engine configured to train, using the perturbed training data set, the first machine learning architecture to establish a trained machine learning architecture; and
an architecture compression engine configured to prune one or more elements of the machine learning architecture to generate an compressed machine learning architecture;
wherein the training engine is also configured to generate the hardened compressed machine learning architecture by training, the compressed machine learning architecture using the perturbed training data set;
wherein the recipient device data storage is configured to receive the hardened compressed machine learning architecture; and
wherein the at least one recipient device processor is configured to utilize the hardened compressed machine learning architecture for generating one or more data structures representative of one or more prediction outputs, the hardened compressed machine learning architecture hardened against the one or more potential adversarial attacks.

23. A recipient device for receiving a hardened compressed machine learning architecture, hardened for resilience against one or more potential adversarial attacks from an originating device including at least one originating device processor, the originating device in electronic communication with the recipient device, the recipient device comprising:

a network interface coupled to the originating device, the originating device including at least one originating device processor configured to interface with a first machine learning architecture, and to provide:
an adversarial attack generation perturbation engine configured to receive a first training data set and to generate a perturbed training data set based on the first training data set;
a training engine configured to train, using the perturbed training data set, the first machine learning architecture to establish a trained machine learning architecture; and
an architecture compression engine configured to prune one or more elements of the machine learning architecture to generate an compressed machine learning architecture;
wherein the training engine is also configured to generate the hardened compressed machine learning architecture by training, the compressed machine learning architecture using the perturbed training data set;
a recipient device data storage configured to receive the hardened compressed machine learning architecture; and
at least one recipient device processor configured to utilize the hardened compressed machine learning architecture for generating one or more data structures representative of one or more prediction outputs, the hardened compressed machine learning architecture hardened against the one or more potential adversarial attacks.

* * * * *